(12) United States Patent
Crookham et al.

(10) Patent No.: US 6,681,110 B1
(45) Date of Patent: Jan. 20, 2004

(54) MEANS AND APPARATUS FOR CONTROL OF REMOTE ELECTRICAL DEVICES

(75) Inventors: Joe P. Crookham, Oskaloosa, IA (US); Antonio Rivera, Oskaloosa, IA (US); Michael B. Foster, Oskaloosa, IA (US); Ryan A. Marsh, Oskaloosa, IA (US); Walter R. Tippett, Oskaloosa, IA (US); Patrick K. Cooley, Wilton, IA (US)

(73) Assignee: Musco Corporation, Oskaloosa, IA (US)

( * ) Notice: Subject to any disclaimer, the term of this patent is extended or adjusted under 35 U.S.C. 154(b) by 406 days.

(21) Appl. No.: 09/609,000

(22) Filed: Jun. 30, 2000

Related U.S. Application Data
(60) Provisional application No. 60/142,109, filed on Jul. 2, 1999.

(51) Int. Cl.[7] .................................................. H04M 3/00
(52) U.S. Cl. ...................... 455/420; 455/419; 455/556; 455/456; 455/344; 340/825.22; 340/525; 340/5.22; 340/5.64
(58) Field of Search ................................ 455/556, 420, 455/456, 454, 344, 419; 702/188; 340/825.22, 525, 5.22, 5.64

(56) References Cited

U.S. PATENT DOCUMENTS

| | | |
|---|---|---|
| 4,423,471 A | 12/1983 | Gordin |
| 4,712,167 A | 12/1987 | Gordin et al. |
| 4,729,077 A | 3/1988 | Gordin et al. |
| 4,994,718 A | 2/1991 | Gordin |
| 5,207,747 A | 5/1993 | Gordin et al. |
| 5,313,378 A | 5/1994 | Gordin et al. |
| 5,483,535 A | 1/1996 | McMillen et al. |
| 5,594,740 A | 1/1997 | LaDue |
| 5,729,471 A | 3/1998 | Jain et al. |
| 5,745,126 A | 4/1998 | Jain et al. |
| 5,769,527 A | 6/1998 | Taylor et al. |
| 5,846,132 A | 12/1998 | Junkin |
| 5,860,733 A | 1/1999 | Stone et al. |

(List continued on next page.)

FOREIGN PATENT DOCUMENTS

| | | | |
|---|---|---|---|
| WO | WO97/38540 | * 10/1997 | ............ H04Q/7/22 |
| WO | WO 99/60769 | 11/1999 | |
| WO | WO 01/03414 A1 | 1/2001 | |

OTHER PUBLICATIONS

Cellemetry® Applications Services, 1 pg. Internet Printout on Jul. 21, 1999.

Cellemetry® website printouts; "About Cellemetry"; 22 pgs.;printed Jun. 15, 1999.

Cellemetry® "Bringing Remote Equipment Closer" brochure insert pages (39 pgs. total); © 1997.

Primary Examiner—Sinh Tran
Assistant Examiner—David Q Nguyen
(74) Attorney, Agent, or Firm—McKee, Voorhees & Sease, P.L.C.

(57) ABSTRACT

An apparatus to control remote devices or equipment via existing cellular telephone networks. The apparatus receives information from a customer concerning a specific function, which the customer wants to perform at the remote equipment. A Central Control receives this information from the customer and correlates the function to a specific cellular telephone MIN number, which has been pre-programmed in a computer at the Central Control. The MIN number is then sent to a cellular provider. The cellular provider then transmits the MIN number to an antenna, which transmits the MIN number to a remote equipment controller at the remotely located equipment. The remote equipment controller then takes the a part of the MIN and gives these numbers to a PLC at the remote equipment controller. The PLC then memory maps the part of the MIN to a specific function to be carried out by the remote equipment controller. Then the remote equipment controller carriers out specified functions at the remote equipment.

12 Claims, 26 Drawing Sheets

U.S. PATENT DOCUMENTS

| | | |
|---|---|---|
| 5,882,263 A | 3/1999 | Chung |
| 5,929,849 A | 7/1999 | Kikinis |
| 6,002,394 A | 12/1999 | Schein et al. |
| 6,035,304 A | 3/2000 | Machida et al. |
| 6,044,405 A | 3/2000 | Driscoll, III et al. |
| 6,295,448 B1 * | 9/2001 | Hayes et al. ................. 455/420 |
| 6,308,083 B2 * | 10/2001 | King ........................... 455/556 |
| 6,415,245 B2 * | 7/2002 | Williams et al. ............ 702/188 |

* cited by examiner

SCHEDULE

STATE A, CITY 1

LOCATION: TWIN PEAKS PARK

| LIGHTING ZONE | ON TiIME | OFF TIME |
|---|---|---|
| SOFTBALL INFIELD | 18:00 | 22:30 |
| SOFTBALL OUTFIELD | 18:15 | 22:15 |
| SOCCER FIELD | 17:00 | 21:00 |
| SECURITY LIGHTS | 19:00 | 6:00 |

*Fig.10*

REC WIRING DATA

LOCATION (FIELD, BALLFIELD):_____

REMOTE EQUIPMENT CONTROLLER:_____

| RELAY | CONTROL ZONE | POLES | CONTRACTORS | DEFAULT STATE |
|---|---|---|---|---|
| 1 | | | | |
| 2 | | | | |
| 3 | | | | |
| 4 | | | | |
| 5 | | | | |
| 6 | | | | |

Fig.11

LOGIN

| APPLICATION ID | |
|---|---|
| PASSWORD | |
| | LOGIN |

*Fig.13*

OUTPUT CONTROL

| MENU | UNIT NUMBER | 0061014000 ▼ (MIN#) | REFRESH |

SEND

IMMEDIATE CONTROL

| ☀ | ON | OUTPUT | 1 | 2 | 3 | 4 | 5 | 6 | 7 | 8 |
|---|----|--------|---|---|---|---|---|---|---|---|
| 💡 | OFF | STATE | 💡 | 💡 | 💡 | 💡 | 💡 | 💡 | 💡 | 💡 |

SCHEDULE: UNDEFINED

| Row# | Mnth | Day | Once | Hr | Min | MO | TU | WE | TH | FR | SA | SU | Op1 | Op2 | Op3 | Op4 | Op5 | Op6 | Op7 | Op8 |
|------|------|-----|------|----|----|----|----|----|----|----|----|----|----|----|----|----|----|----|----|----|
| 2 ✓ | ☐ | ☐ | X | 11 | 10 | ✓ | ✓ | ✓ | X | ✓ | ✓ | ✓ | 💡 | 💡 | 💡 | 💡 | 💡 | 💡 | 💡 | 💡 |
| 1 ✓ | ☐ | ☐ | X | 11 | 16 | X | X | X | ✓ | X | X | X | ☀ | ☀ | ☀ | ☀ | ☀ | ☀ | ☀ | ☀ |

CLICK CELL IMAGE TO TOGGLE SETTING. CLICK "REC#"
CELL IMAGE TO DELETE RECORD.

| INSERT | UPDATE |

CANCEL

*Fig.15*

MUSCO CONTROL-LINK SCHEDULER

INSTRUCTIONS: 1: FOLLOW INSTRUCTIONS 1-4 BELOW.
2. WHEN COMPLETED EMAIL THIS FORM TO SCHEDULE @ MUSCO OR FAX TO 800-XXX-YYYY
*IF YOU HAVE ANY QUESTIONS OR PROBLEMS CALL CONTROL-LINK CENTRAL DIRECTLY AT 877-XXX-YYYY

CUSTOMER NAME: CITY OF BARTLETT
CUSTOMER NUMBER: XYZ
CITY & STATE: BARTLETT TN.

1. FILL IN USERCODE, PASSWORD AND FACILITY.
USERCODE: [REQUIRED]
PASSWORD: [REQUIRED]
FACILITY: [REQUIRED]

2. IF YOU WOULD LIKE YOUR CONFIRMATION SENT DIFFERENTLY THAN INDICATED BELOW, PLEASE LET US KNOW HOW YOU WOULD LIKE YOUR CONFIRMATION SENT, I.E., PHONE, EMAIL OR FAX.
SEND BACK CONFIRMATION OF THE SCHEDULE TO:

3: ESTABLISHED WEEKLY SCHEDULES. (THESE OCCUR WEEKLY BY DEFAULT)
BEGINS WEEK OF:

| ZONE REQ'D. | MON. ON | MON. OFF | TUES. ON | TUES. OFF | WED. ON | WED. OFF | THURS. ON | THURS. OFF | FRI. ON | FRI. OFF | SAT. ON | SAT. OFF | SUN. ON | SUN. OFF |
|---|---|---|---|---|---|---|---|---|---|---|---|---|---|---|
| | | | | | | | | | | | | | | |
| | | | | | | | | | | | | | | |
| | | | | | | | | | | | | | | |
| | | | | | | | | | | | | | | |
| | | | | | | | | | | | | | | |

4. FILL ANY EXCEPTION SCHEDULING NEEDS WHICH ARE DIFFERENT THAN YOUR FIXED SCHEDULE.

| ZONE | START DATE | START TIME | END DATE | END TIME |
|---|---|---|---|---|
| | | | | |
| | | | | |
| | | | | |
| | | | | |
| | | | | |
| | | | | |
| | | | | |
| | | | | |

NOTE: LACK OF REQUIRED INFORMATION WILL DELAY THE IMPLEMENTATION OF YOUR SCHEDULE.

COPYRIGHT 1999 MUSCO LIGHTING INC.

Fig.16

MUSCO LIGHT ZONE INFORMATION FORM

CITY: ☐          STATE: ☐

TIME ZONE: ☐

DAYLIGHT SAVINGS TIME Y/N: ☐

FACILITY NAME: ☐

UNIT/REC NUMBER: ☐

RELAY 1 DESCRIPTION: ☐

RELAY 2 DESCRIPTION: ☐

RELAY 3 DESCRIPTION: ☐

RELAY 4 DESCRIPTION: ☐

RELAY 5 DESCRIPTION: ☐

RELAY 6 DESCRIPTION: ☐

CUSTOMER LIGHT ZONES:
DESCRIPTION                              RELAYS

_____            _____
_____            _____
_____            _____
_____            _____
_____            _____
_____            _____
_____            _____

SCHEDULE INFORMATION:

Fig. 17

MUSCO CONTROL-LINK CUSTOMER INFORMATION FORM

CUSTOMER INFORMATION

NAME:

ADDRESS 1:

ADDRESS 2:

CITY:

STATE:

ZIP:

PHONE:

FAX:

MAIN CONTACT INFORMATION

MAIN CONTACT NAME:

DAY PHONE:

NIGHT PHONE:

CELL PHONE:

PAGER:

*Fig. 18*

MUSCO CONTROL-LINK FACILITY INFORMATION FORM

CUSTOMER NAME:

FACILITY (PARK) NAME:

ADDRESS 1:

ADDRESS 2:

CITY:

STATE:

ZIP:

PHONE:

EMERGENCY CONTACT INFORMATION
EMRGENCY CONTACT NAME:

PHONE:

TIME INFORMATION:
TIME ZONE:

DAY LIGHT SAVINGS TIME Y/N:

Fig.19

MUSCO CONTROL-LINK SCHEDULER INFORMATION FORM

CUSTOMER NAME:

SCHEDULER NAME:

ADDRESS 1:

ADDRESS 2:

CITY:

STATE:

ZIP:

PHONE:

CELL PHONE

FAX:

EMAIL:

PAGER:

USERCODE:

PASSWORD:

FACILITIES (PARKS) THEY ARE ALLOWED TO SCHEDULE:

*Fig.20*

MUSCO CONTROL-LINK USER INFORMATION FORM

CUSTOMER NAME:

(PARK) USER NAME:

ADDRESS 1:

ADDRESS 2:

CITY:

STATE:

ZIP:

PHONE:

FAX:

EMAIL:

MAIN CONTACT NAME:

FACILITIES (PARKS) THEY ARE ALLOWED TO USE:

*Fig.21*

GROUP NO. 1
DAY NO. 1
- EVENT SLOT NO. 1 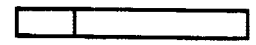
- EVENT SLOT NO. 2 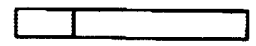 — — 4 BYTES
- EVENT SLOT NO. 3 
- EVENT SLOT NO. 4 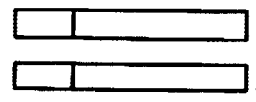
7 BITS- 00-95 - TIME SLOT NO
96 - SUNRISE
97 - SUNSET
98 - UNPROGRAMMED
99 - UNUSED CODE
1 BIT- 0=OFF EVENT
1=ON EVENT
•
•
•
DAY NO. 1
- EVENT SLOT NO. 1 
- EVENT SLOT NO. 2  — — 4 BYTES
- EVENT SLOT NO. 3 
- EVENT SLOT NO. 4 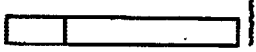
{GROUP NO. 2
•
•
•
{GROUP NO. 10
Fig.22

GENERIC FORM OF A COMMAND WITH TWO FOCC AND ONE RECC

1. FOCC ADDRESS PAGE
2. FOCC DATA PAGE NO. 1 (USING PRIMARY COMMANDS MINS)

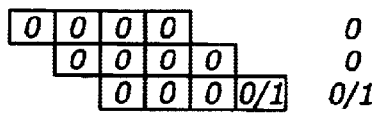

3. FOCC DATA PAGE NO. 2 (USING SECONDARY COMMAND MINS)

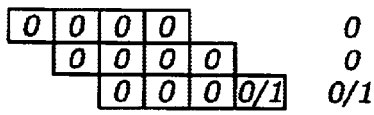

4. REGISTRATION RESPONSE - VERIFICATION ONLY

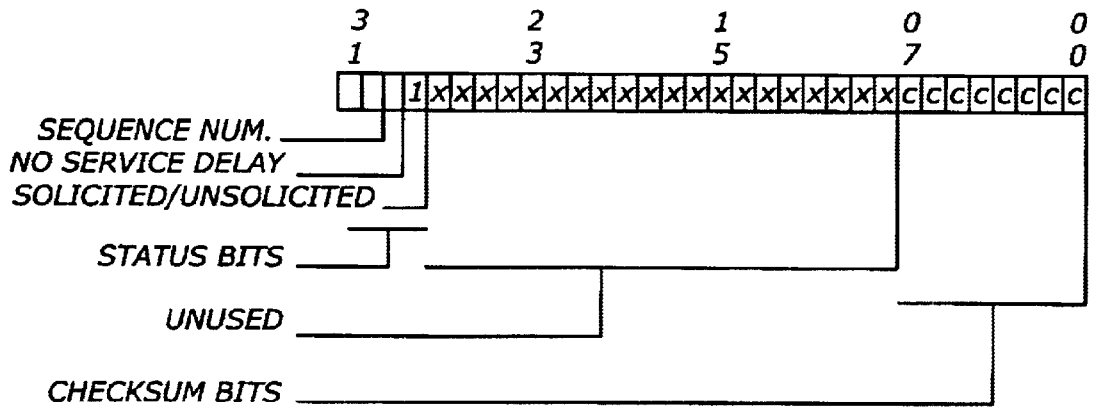

CHECKSUM IS THE DECIMAL SUM OF THE LAST THREE (3) DIGITS OF ADDRESS PAGE PLUS THE LAST THREE (3) DIGITS OF COMMAND PAGE PLUS LAST THREE (3) DIGITS OF DATA PAGE REPRESENTED AS AN EIGHT (8) BIT VALUE. THE RESULT IS THEN CONVERTED TO A ONE'S COMPLEMENT AND KEPT AS A SINGLE 8-BIT VALUE.

EXAMPLE:
FOCC ADDRESS PAGE:   0 0 6 1 0 1 4 0 2 7
FOCC COMMAND PAGE:   p p p p p p p 5 0 5
FOCC DATA PAGE:      s s s s s s 1 5 1

```
              3         2         1         0       0
              1         3         5         7       0
REGISTRATION: 0101000000000000000000001111101011
```

CHECKSUM: 0+2+7+5+0+5+1+5+1 = 26 = 00011010
ONE'S COMPLEMENT:                      11100101

Fig.23

MEANS AND APPARATUS FOR CONTROL OF REMOTE ELECTRICAL DEVICES

CROSS-REFERENCE TO RELATED APPLICATIONS

This application claims the benefit of U.S. Provisional Application(s) No(s) 60/142,109 filed Jul. 2, 1999.

BACKGROUND OF THE INVENTION

1. Field of the Invention

The present invention relates to control of remote devices, and in particular, control of remotely located electrical equipment, including but not limited to, lighting systems.

2. Problems in the Art

Large area lighting systems are well known in the art. They can take many different forms. From baseball diamonds to playgrounds, to parking lots, to golf courses; large area lighting systems are all around in today's society.

In some instances, the lighting system is turned on and off automatically by timers, photo detectors, or other devices. This works reasonably well if the lights are used on a regular schedule or according to regularly repeating occurrences. In other cases, employees, staff members, or other persons must be hired or have the obligation to turn on and off the lights, particularly if the lights are used or needed only sporadically. Most of the time the person maintaining the lights will have to take care of several keys for several lights. These people usually travel back and forth between the field and his/her home and even field to field because the lighting is commonly used during non-business hours. In the time it takes a staff member to travel, the lights have been unnecessarily left on. Such a problem is further compounded when the staff member is not informed that the lights are no longer needed for a certain event. When the lights are not turned off, this results in a waste of energy. This waste usually results in a waste of taxpayer's money. The waste of taxpayer money is furthered by the presence of vandalism, which often occurs to remote lighting systems.

An ancillary problem with manual control of large area lighting systems is that the person in charge normally must handle keys for the electrical boxes or buildings in which the switches or breakers are located to turn the lights on and off. Access by the public at large to the switches is usually blocked for safety, economic, and practical reasons. Such keys must to carefully handles and be available to control the lights. This can be cumbersome.

There has been some work done with computerized control of electrical loads or systems. The computer can have a database of instructions that could include turning a device on or off. The computer could utilize its internal clock or other criteria to issue commands. However, such systems generally require a dedicated computer to control each device or no more than several devices at a location. Such systems also generally require special interactive software developed for each application. To change operation of the computer it must be reprogrammed, or new software must be installed. Either case requires significant time and expense.

Some attempts at remote control have been made. One example uses established paging systems as the carrier of instructions to remotely located devices which are to be controlled. Paging systems are attractive because they have currently developed to a point where they can carry a significant amount of digital data instructions. However, they can be somewhat costly, including communication costs.

The paging system could include a central repository of instructions. Control of remote devices based on the central repository is accomplished by sending out paging messages with control instructions carried therein to a paging receiver at the remote device. While this can eliminate many of the problems associated with other methods of operating lighting systems, a major deficiency with paging systems presently exists. In the United States, paging systems cover most densely populated geographic areas. Most major-sized cities have good coverage. However, coverage is lacking in many other places. Of course, electrical devices, including large area lighting systems, are not limited to big cities. In fact, the need for remote control of devices may be more urgent in less densely populated areas. Thus, while paging systems offer some promise, they simply will not work in some areas because paging communications do not reach those areas.

Furthermore, paging systems tend to be one-way only, and therefore of limited capacity and options. Two-way paging is presently only in development. Digital paging systems are also in development, but it is estimated that infrastructure for substantial geographic coverage is several decades away.

Remote control of devices using DTMF signaling is in use. An example is remote control of the functions of an answering machine by pressing different telephone keys. This can be accomplished over regular or cellular phones. However, because it involves establishing a telephone connection with the remote device, it must use the voice channels. This is not satisfactory. Voice channels are not always available. They can be unreliable. This also involves the cost of using the voice channel while communicating the instructions.

A wireless communications system with more geographical coverage is the cellular telephone system. It is attractive because of this broader geographic coverage and its existent infrastructure. Therefore, like the paging network, capital costs of developing and installing a new infrastructure could be avoided. It is also attractive because it has a built-in confirmation function. However, it is extremely limited in the data that it can carry, especially out to remote devices, without invoking its voice channels. For example, because of inherent limitation in the present cellular communications protocol in the USA (Advanced Mobile Phone Service or AMPS), it may be able to carry only three digits of instructions in each call via the last four digits on each cellular phone's Mobile Identification Number (MIN), a ten digit number in the form of a conventional telephone number; i.e. abc-def-wxyz, where a,b,c,d,e,f,w,x,y, and z are a single digit including and between 0 and 9, and where abc is the area code (three digits), def is the identification of the local central switching office (CTO) for the land based telephone system (three digits), and wxyz is a four digit identification for the phone (equivalent to the "line" number in conventional phone systems). This is well-known and widely documented.

Under Federal Communications Commission (FCC) regulations, two cellular phone carriers for each geographic area are each given 416 duplex voice channels, and 21 control channels. Carrier 1's channels are called the A channels and carrier 2's channels are called the B channels. Forward control channels (FOCC's) are from the cell base station to a cell phone; reverse control channels (RECC's) are from the phones to the base station. Under AMPS protocol, up to three digits in the MIN can be used for carrying data on the forward control channels.

An advantage of using the control channels of AMPS is that the messages are cheap because they are short and do not involve the voice channels. Also the control channels are transmitted at higher power than the voice channels, have better error correction and better frequency use, and have less traffic. Therefore, they are more reliable as a communication link.

Therefore, current cellular telephone systems and protocols (e.g. Advanced Mobile Phone System (AMPS) in North America; other similar analog systems are NAMPS and ENAMPS) are simply unacceptable because of the limitation of information that could be included as instructions or control in cellular calls.

To have meaningful control of remote devices usually requires communication of more than three digits of instructions. At a minimum, this limitation would not allow an acceptable of level of flexibility for many applications.

Also, the utilization of MINs to both serve to instigate a cellular call and, with the same number, effect an operation (e.g. turning lights on or off) at a remote site is not indicated as a realistic use of MINs or the cellular network.

One example of a cellular telephony based remote control system is that of Cellemetry of Atlanta, Ga. It provides the means of sending short, telemetry-like messages over the cellular telephone system. Examples include reporting (a) alarm panel status, (b) utility meter readings, (c) vehicle and trailer location, and (d) vending machine status. It does utilize the overhead control channels (FOCC's and RECC's) of cellular telephone systems to communicate the information. However, its primary uses involve transmitting data or information or status from remote locations to a central location.

One specific example involves soft drink vending machines. Reports can be communicated to a central location regarding how much product has been sold and/or how much money has been received and/or how much change has been dispensed. Another example involves turning off a machine or turning security on at the machine. However, there is no known ability with such systems to have individualized schedules or control options at each remote device that can be handled via the three digits of a cellular control channel registration message sent over the FOCC.

Such a system could use different MINs to set and reset flags in a programmable logic controller (PLC), for example, through a single input/output port, but there is no known controlling of resistive or inductive loads with MINs mapped in a PLC memory to functions. There is no known instruction set coded to MINs. The problem is one of availability of MINs. If each remotely positioned PLC with a cellular radio were given ten instructions to which it would respond, the cellular carrier would have to provide ten unique and distinct MINs for each such radio. If there were only two radios, only 20 MINs would be needed. But one hundred radios would need 1000 MINS. One thousand radios would need ten thousand MINs and so on. If there are any meaningful number of remote devices to be controlled (and remote radios), there would not be enough MINs or the number of MINs per phone would have to be restricted.

Essentially, cellular systems have wider coverage geographically than paging systems, but much more restricted data capacity. Therefore, cellular systems are not indicated to be viable candidates for flexible remote control of devices.

There is no known existing system that remotely controls resistive or inductive electrical loads according to a centralized schedule through the cellular system control channels.

The state of the art has not revealed a way of solving the conflicting concerns of cost, capacity, and coverage relative to centralized, automated control of multiple remotely located electrical devices. Therefore, there is a need for improvement in the art.

OBJECTS, FEATURES, AND ADVANTAGES OF THE INVENTION

A principal object of the present invention is therefore to provide an apparatus and method of controlling remotely located devices, which improves over or solves the problems and deficiencies in the art.

Other objects, features, and advantages of the present invention is to provide an apparatus and method as above described which:

a) Is wireless.
b) Does not require specialized lighting control software or the need for distributed software or updates.
c) Facilitates low cost use of communications networks (e.g. control channel of cellular, Internet).
d) Does not require a dedicated PC at each remote location.
e) Does not require a telephone line for each remote location and eliminates expensive installation of phone lines.
f) Does not require additional phone lines or hard wiring.
g) Reduces human time and the chance of human error.
h) Is cost effective.
i) Reduces staff legwork and time traveling from location to location, before or after events.
j) Eliminates human resources, time, and cost to physically travel to location(s) and manually operate the remote devices.
k) Saves energy by operating the remote devices only when they are needed.
l) Uses existing communications infrastructures (e.g. Internet, telephone networks, cellular networks).
m) Allows for centralized support services.
n) Provides for easy training of end users (operators, customers, and interested persons).
o) Optionally provides a confirmation sent for each new schedule or change.
p) Is especially flexible for variable schedules at multiple locations.
q) Saves time.
r) Saves money.
s) Can be predominately automated.
t) Allows for centralization of data yet distribution of individualized control at each remote device.
u) Reduces need to distribute and track multiple sets of keys.
v) Is vandal resistant.
w) Has significant flexibility.
x) Is retrofittable.
y) Adapts to existing facilities, systems and devices.
z) Is expandable and upgradeable.
aa) Is reliable.
bb) Does not tie up voice channels.

These and other objects, features, and advantages of the present invention will become more apparent with reference to the accompanying specification and claims.

SUMMARY OF THE INVENTION

The present invention involves methods and apparatus for controlling remote devices or systems. The present invention details a way for a user to control a plurality of functions at a remote device or location by using the existent cellular telephone system, a control center, and a remote equipment controller at each remote device or system.

A control center is established, preferably including a computer. An end user of a remote device or system can contact the control center, including via Internet, e-mail, phone, cell phone, fax, or even mail, to request performance of operations by the remote device or system according to a schedule. The control center stores the schedule and assigns or codes the desired request to one or more MINs (mobile identification numbers) of a cellular telephone system. The MIN is a ten digit number which correlates to a cellular phone number. The control center is assigned a plurality of MIN's assigned by a cellular carrier. The MIN's can be designated with area codes that are not accessible by common carriers. Therefore, a standard cellular phone cannot be called using the MIN's assigned to the central location.

The remote equipment controller includes a processor with memory that is pre-programmed with the authorized MINs and functions for the particular remote device. The processor is operatively connected to components that can effectuate a function in the remote device upon appropriate instruction from the processor. When the schedule indicates an action should occur at the remote device, the control center retrieves the MIN for the function chosen by the user, and the MIN is sent to the cellular provider. The cellular provider then calls the MIN of the remote radio located on the remote or system. Once the radio receives the call from the cellular provider, it passes all ten digits of the MIN to the processor (e.g. a PLC or programmable logic controller). The processor uses a memory lookup table to map the digits (e.g. the last three digits of the MIN) to a specific pre-programmed function. Once this function is located, the processor then performs this function. Thus, the remotely located device can be controlled, even according to multiple instructions, by communication through the very limited data headroom of the control channel of a cellular telephone system.

Central control can utilize what is called a gateway to the cellular network to communicate to the remote cellular radios and to store both the schedules and the coded MINs.

As used herein, the terms "central control" or "control central" refer sometimes to "central control" alone and sometimes to "central control" and a dedicated gateway to the cellular network. In other words, the functions attributed to central control could be performed with appropriate components completely at central control, or some functions (e.g. storing of database, use of database, interface with the cellular network) could be delegated to another system, such as a gateway system, as will be further discussed below.

BRIEF DESCRIPTION OF THE DRAWINGS

FIG. 10 is a depiction of a lighting schedule for the ball field of FIG. 8.

FIG. 11 is a depiction of a data table filled out and placed in an REC or LCC to set forth which contactors and relays control which zones of a lighting system.

FIGS. 13–15 are screen displays of a graphic user interfaces for entering schedule information at a web site, either of central control or a gateway.

FIGS. 16–21 are examples of forms used to collect data for inclusion in the database used to control the remote devices and to communicate with customers.

FIG. 22 is a diagrammatical illustration of the data structure of a schedule according to an embodiment of the invention.

FIG. 23 is a diagrammatic depiction of a communication according to an embodiment of the invention.

DETAILED DESCRIPTION OF A PREFERRED EMBODIMENT

To assist in a better understanding of the invention, a detailed description of a preferred embodiment will now then be set forth. It is to be understood that this describes but one specific form of the invention can take, and that others are possible. Appended drawings will be referred to as description.

A brief overview of the preferred embodiment in the particular environment for this example of the invention will be given. A specific description of the structure or physical components of the preferred embodiment will follow. Thereafter, a discussion of how the structure functions in its working environment will be set forth. Finally, operational matters and features, as well as alternative embodiments, will be discussed.

OVERVIEW

This embodiment will be discussed in the context of remotely controlling lighting systems at a number of remote locations. However, it is to be understood that the invention can be applied in a variety of ways to a variety of remotely located equipment.

Figure 1:
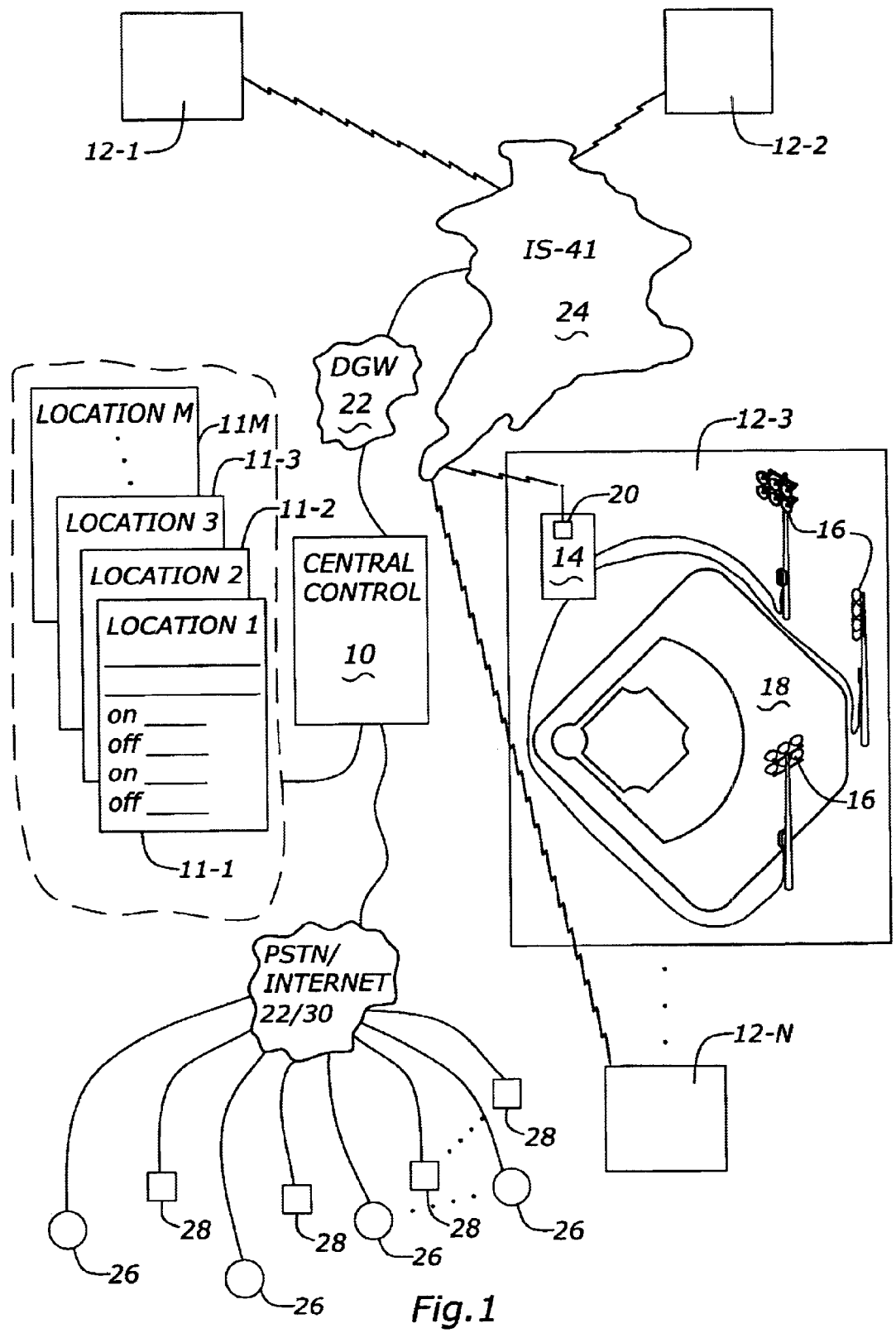
FIG. 1 is a diagrammatic overview of a system according to a preferred embodiment of the invention.

The general concept of a system according to the preferred embodiment is illustrated in FIG. 1. What will be called Central Control 10 includes a computer having a significant amount of memory and processing power. A plurality of lighting systems 12, located remotely from Central Control 10, each include what will be called a Remote Equipment Controller (REC) 14 which includes components that can turn lights 16 for each ballfield 18 on or off. REC 14 further includes a cellular phone or radio 20.

Figure 8:
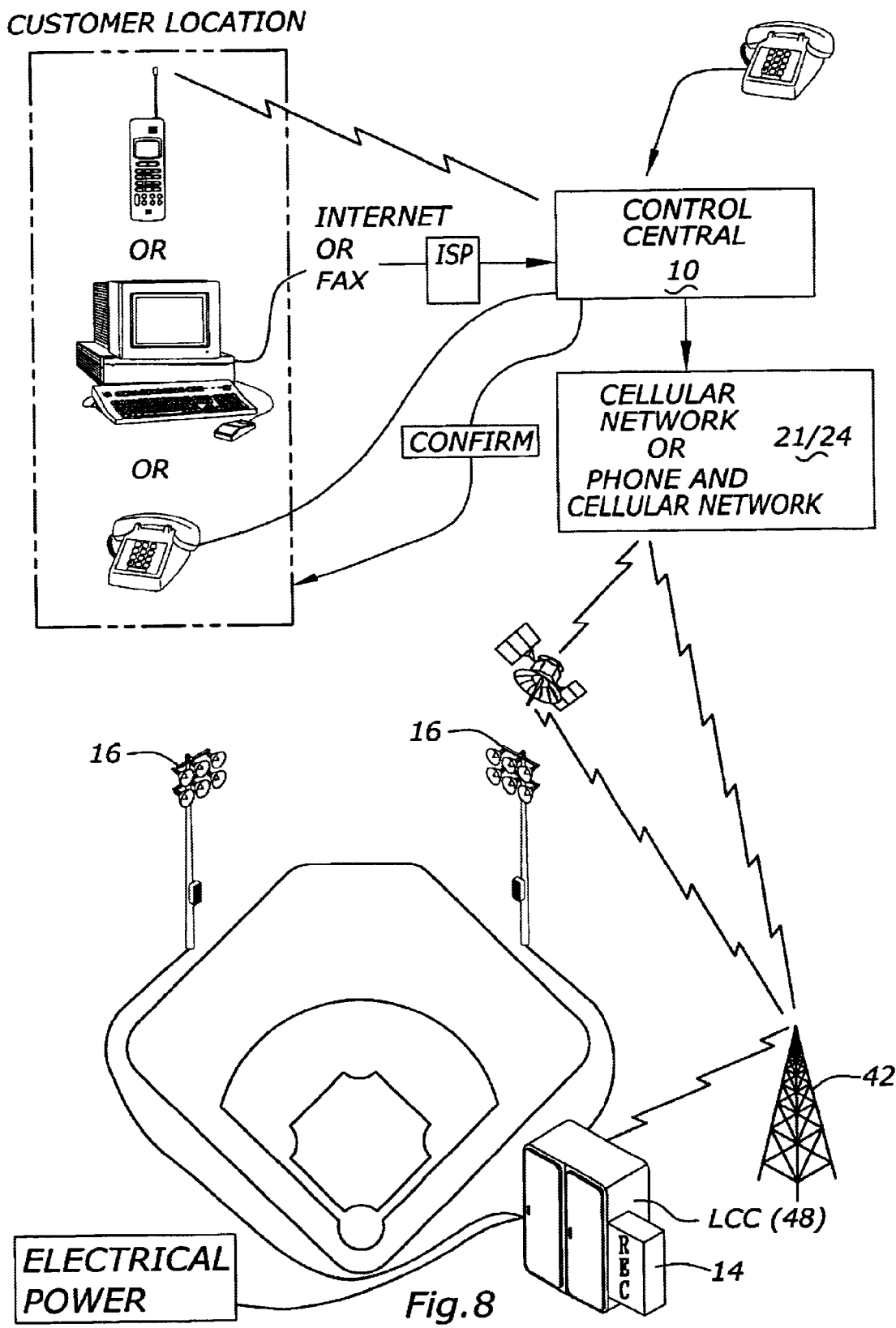
FIG. 8 is a diagrammatic depiction of the system of FIG. 1 with respect to a remotely located lighting system for a ball field.
Figure 8B:
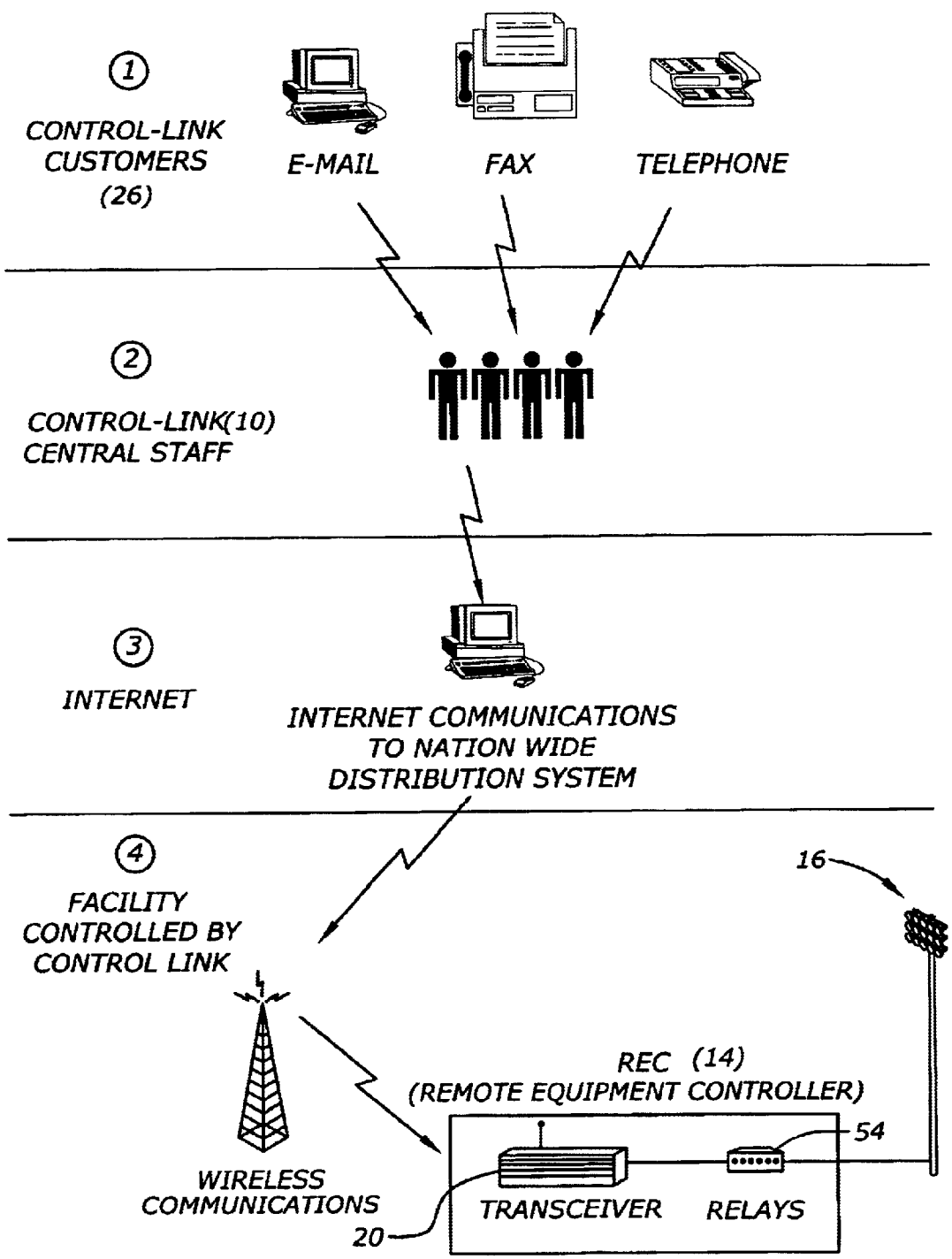
FIGS. 8B and 8C are an additional diagrammatic depictions of the system of FIG. 1.
Figure 8C:
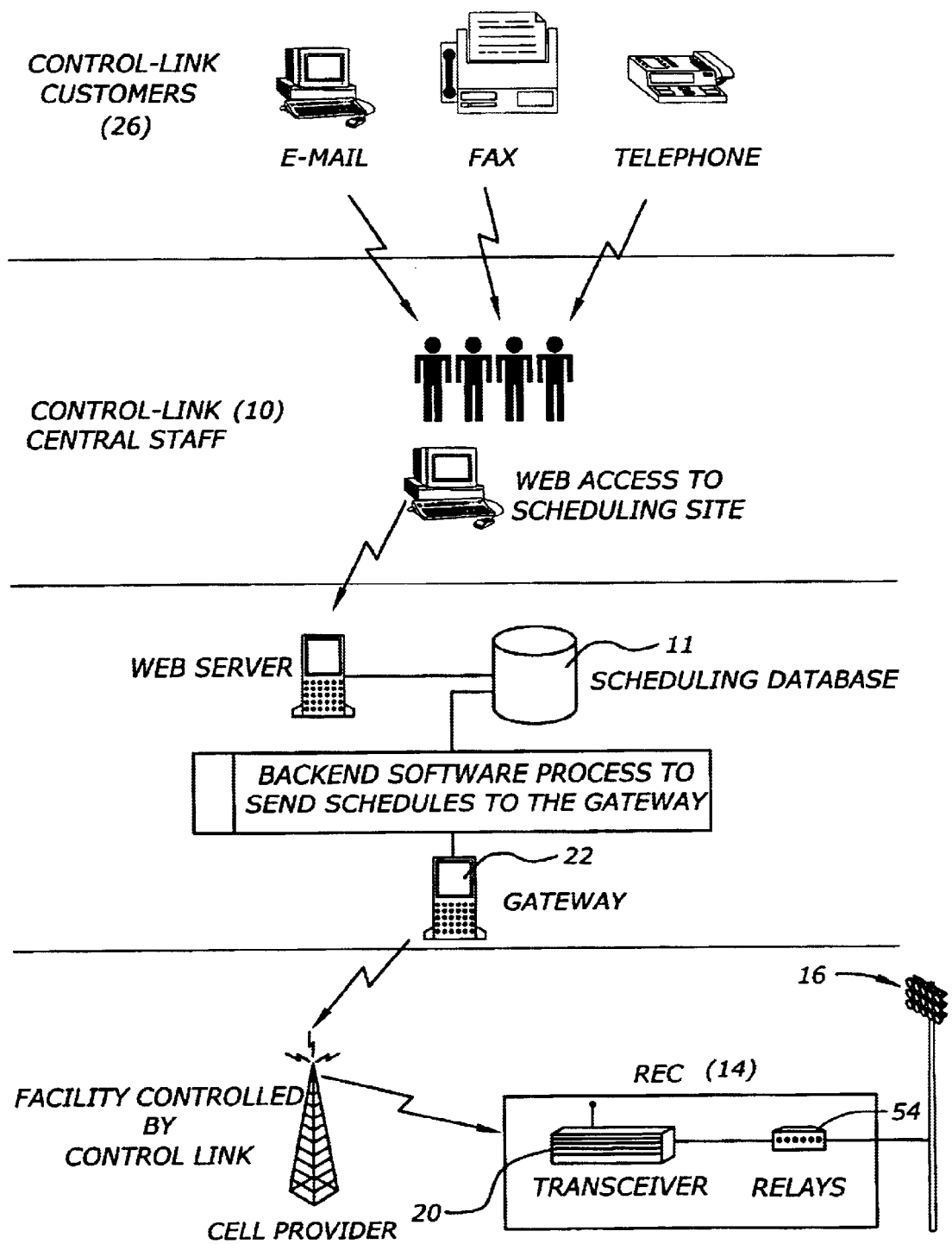

As shown in FIGS. 1 and 8C, Central Control 10 is in communication with a dedicated gateway system 22 (DGW), which in turn is in communication with the Intersystem Signaled Network (ISN IS-41) 24 that interlinks all the cellular phone systems in the U.S.

Central Control 10 and/or gateway system 22 includes a database of on-off schedules 11 for each lighting system 12. At the appropriate times, software and equipment at Central Control 10 (or gateway 22) instigates a call to the appropriate radio 20. As will be discussed in more detail below, through this procedure REC 14 can be instructed to turn the corresponding lighting systems 12 on or off, according to schedule. Thus, control of all the remotely located lighting systems can be accomplished from a central location, in a wireless manner to wherever cellular communications can reach (which is almost the entire U.S.), and in an automated, labor-saving, cost-effective fashion.

As further illustrated in FIG. 1, the system could also allow input from what will be called customers 26 and interested persons 28. Examples of customers are municipal park and recreation departments, school districts, and athletic associations. Interested persons can be athletes, parents, or fans of athletic teams using ball fields 18, and thus interested in game times and locations.

Customers/interested persons 26/28, through conventional means such as personal computers, can access Central Control 10 through Internet 30. Schedules and other information regarding the games or use of ballfields 18 would be available to authorized persons. Additionally, authorized persons could communicate changes to schedules 18, post messages, or submit other information to Central Control 10, so that schedules 18 or other important information could be kept current.

By referring briefly to FIG. 8, a personal computer 32, phone 34 or fax 36 could be used by customers 26 to transfer information to Central Control 10 which then instructs the REC's 14 accordingly over the cellular network.

The personal computer, phone or fax (or other communication method) transfers to Central Control 10 information concerning functions the customer wishes to perform at the remote lighting system 12. Central Control 10 matches the request of the customer with a cell phone 20 MIN and then sends it to the REC 14. The REC 14 receives the MIN; interprets this as a function and controls the lights 16 of lighting system 12 in the desired way.

Such a system can be used for a variety of different purposes. Examples are lights at baseball fields, parks, golf courses, swimming pools, parks and bike trails. Other examples are possible.

APPARATUS

Schedules

As explained above, customers 26 can utilize input devices such as PC's 32 (e.g. e-mail), telephones 34 or facsimile machines 36 to send in or make changes to schedules 11. These are all conventional components widely available to the public.

For example, FIGS. 16–21 illustrate examples of forms that could be given to customers or interested persons. The filled-out forms would be returned to Central Control 10.

The input from customers 26 could be processed by employees at Central Control 10, and then entered into a database of schedules 11.

For example, FIG. 16 asks the customer for identification information, security information (section 1), how to contact them either by email or fax (section 2), non-recurring lighting ON or OFF for each lighting zone (section 3), and recurring lighting ON and OFF functions for each zone, including date (section 4). The customer fills this in and faxes, emails, mails, or otherwise gets this to Central Control 10.

FIG. 17 provides a form so that information about how the relays are wired can be compiled for entry into the database.

FIG. 18 provides a form so that information regarding customers can be compiled and entered into the database to keep track of end users of the lights and make monthly reports to the customers regarding light usage, etc.

FIG. 19 describes the facility itself as well as the time zone and whether daylight savings time applies. The database needs this because it is keyed to Greenwich Mean Time.

FIG. 20 compiles information about the facility owner or authorized agent(s) so that only authorized individuals can send scheduling information to Control Central. It also allows verification of a schedule or schedule change by Control Central.

FIG. 21 is an additional form to compile information about the user of the lights or the facility being lighted.

Figure 13:
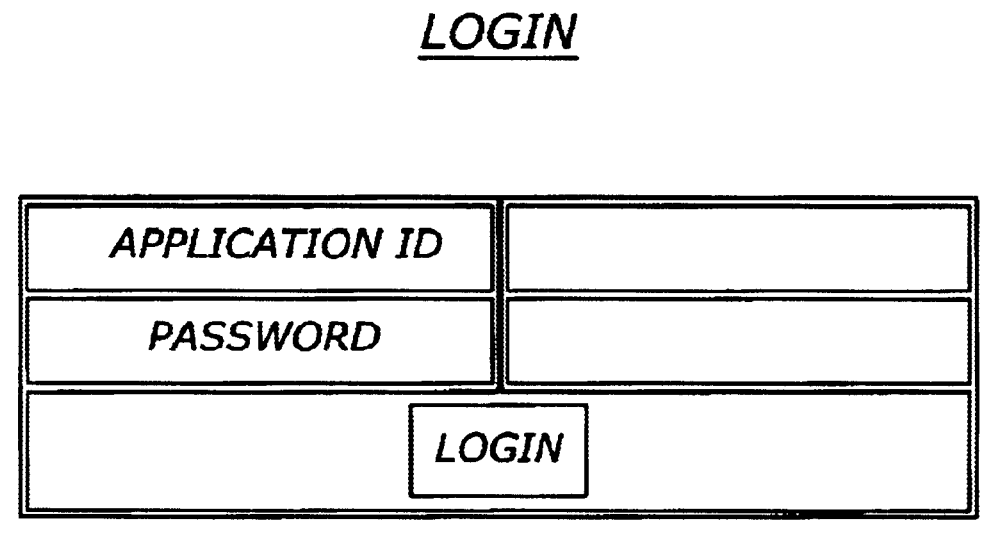
Figure 14:
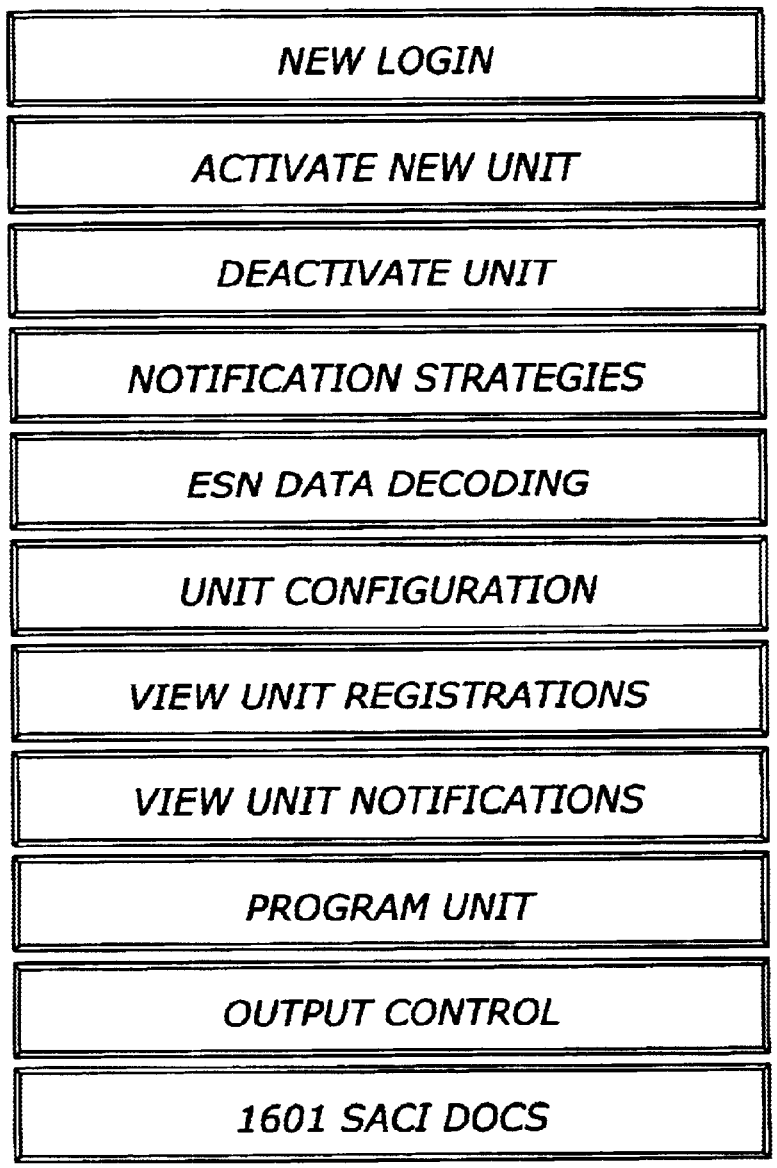

FIGS. 13–15 are examples of graphic user interfaces or screen displays for accessing and entering scheduling and other information into the database. FIG. 13 shows that access preferably is password protected. FIG. 14 shows that a variety of options could exist relative to use of the database, including entry of or changing of schedules (see button labeled "Output Control").

FIG. 15 shows a web site screen after selecting "Output Control" on FIG. 14. Central Control would enter a MIN of a radio 20 in "Unit Number". If immediate override (see "Immediate Control") of an existing schedule is required (e.g. if a customer has just called Central Control and asked to turn on lights currently to off according to the existing schedule), Central Control could override the existing schedule right then for any of the relays/contactors 1–8 for that lighting system.

The "Schedule" section of FIG. 15 allows Central Control to enter the schedule for each relay/contactor (Op 1 to OP 8) for that lighting system, including which days of the week and which months of the year. The "once" column is for single, non-recurring events (from section 3 of FIG. 16). Otherwise, the schedule will recur (from section 4 of FIG. 16). Changes can also be made to the schedule.

Internet

Through standard e-mail, customers can send schedule requests to Central Control 10 over the Internet, and optionally get confirmations back the same way. An advantage of use of Internet 30 is increasing availability to the public, including at their homes, and its availability almost anywhere and anytime, but with no or limited communications cost.

Internet 30 could also be used to communicate between Central Control 10 and gateway 22. The gateway provider could set up and maintain a web site with appropriate user interface and security for these purposes. There is no need for special distributed software to customers 26 or interested persons 28, or the need for dedicated computers at ballfields 18. See FIGS. 13–15.

Central Control

Central Control 10 (in this example via gateway 22) performs a variety of functions. The functions can be as diverse and detailed as desired. For example, control central sends messages over cellular network 24 to the REC's 14. It also can send confirmations that scheduling information has been entered, that a scheduling function has been performed, that a schedule change has been made, etc. to customers 26 via e-mail or fax.

Employees at Central Control 10 review and properly format schedules and deal with scheduling conflicts or other problems. Control central includes a computer (e.g. Dell Computer Corporation PowerEdge Server) with firmware and appropriate software secure from users. A database is maintained to store the scheduling information.

Communications

To better understand the system of the preferred embodiment, the communications between the components of the system must be understood. FIGS. 2–7 illustrate the basic communications concepts.

Figure 2:
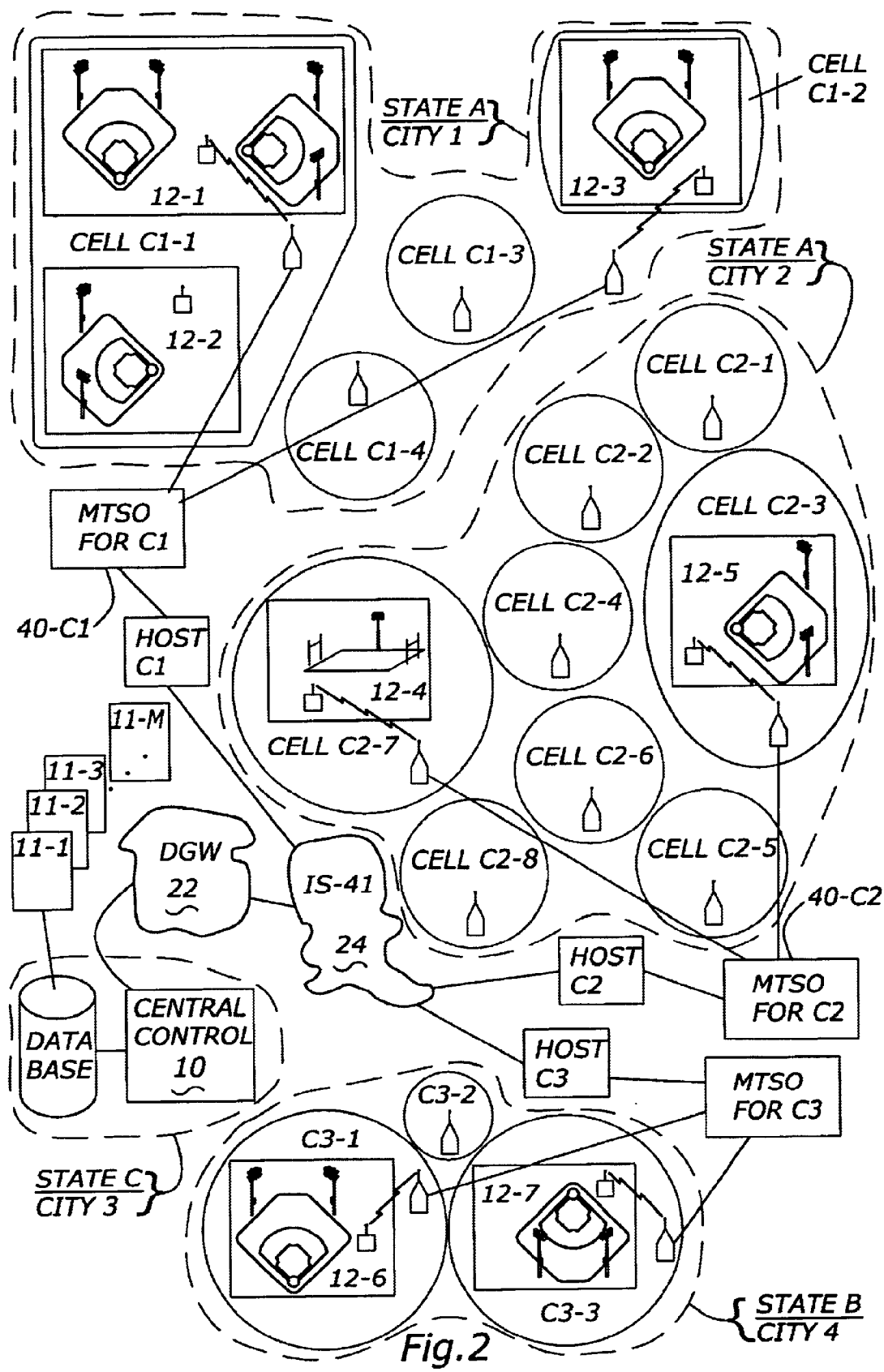
FIG. 2 is a diagrammatic overview of how instructions are communicated from a control center ("Central Control") to a plurality of remote devices.

The system relies on the ability to reach a variety of remote locations in a wireless manner by relying on the cellular phone network. FIG. 2 illustrates this in more detail. Control central 10 is located in State C, City 1. In this example, there are seven lighting systems (numbered 12-1, 12-2, 12-3, 12-4, 12-5, 12-6, and 12-7) to be remotely controlled by control central 10. Lighting systems 12-1, 12-2, 12-3 are located in State A, City 1. Lighting systems 12-4 and 12-5 are located in the same State A, but in City 2. Lighting systems 12-6 and 12-7 are located in a different State C, and City 1 in State C.

City 1 of State A has a cellular carrier C1 that covers City 1 of State A with cells C1-1, C1-2, C1-3, and C1-4. Cellular communications to those cells is controlled by Mobile Telephone Switching Office 40-C1. Carrier C2 covers City 2 of State A with cells C2-1 to C2-7, which are controlled by MTSO 40-C2. Carrier C3 covers City 3 of State B with cells C3-1 to C3-3, which are controlled by MTSO 40-C3.

Intersystem Signaling Network (IS-41)—Connects all Internet Carriers

Central Control 10 is located in still a third State, namely State C, in City 4. As is well-known in the art, Central Control 10 (via gateway 22) can communicate with any of the cells of cellular systems C1, C2, or C3 by using conventional land-line telephone gear and dialing up a cellular phone in any of those geographic areas. A high speed dedicated connection (SS7) between Central Control 10/gateway 22 and the IS-41 signaling network 24 can be made. A backup dial-up modem connection can be available. Cellular systems C1, C2, and C3 are hooked up by high speed dedicated connections to the intersystem signaling network (IS-41) 24 that connects all cellular carriers. Thus, even though Central Control 10 or gateway 22 is in one City in a first State and a lighting system 12 for a ballfield 18 in another City in another State, communication can be made if the ballfield City is covered by a cellular system.

Cellular Carriers

Figure 4:
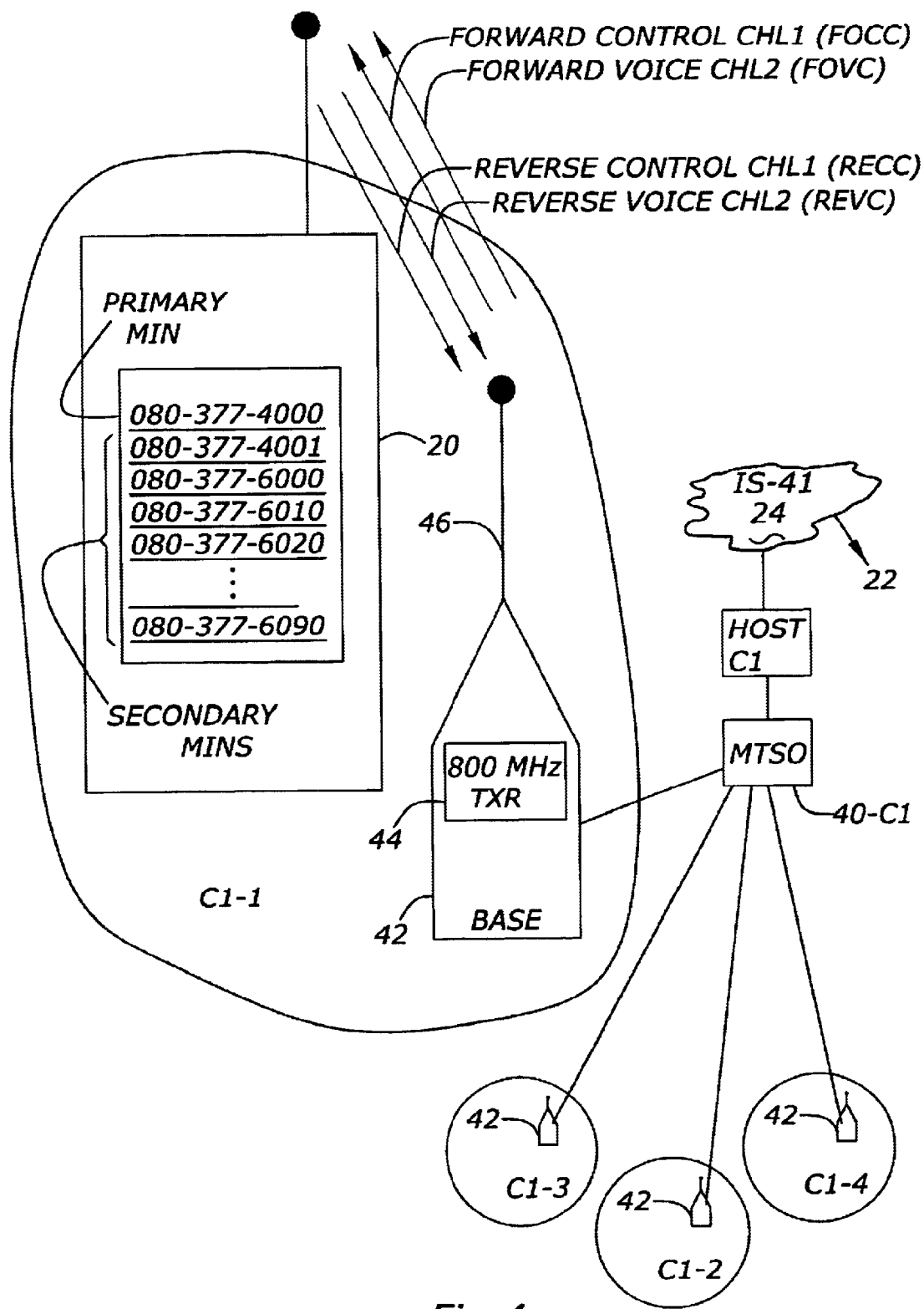
FIG. 4 is a diagrammatic depiction of voice and control channels relative to a cellular transceiver.

As is further well-known in the art, each cell of each cellular system has a base station 42 which includes a transceiver 44 and an antenna 46 (see FIG. 4). The MTSO 40 associated with each collection of cells communicates with any of the base stations 42 in its system (via land-line or wireless). The base stations then communicate in a wireless fashion to the cell phones 20.

Mobile Telephone Switching Office (MTSO), sometimes referred to as an MSC, is established by each cellular carrier in each city or for each collection of cells. It is like a CTO (central telephone office) of conventional land-line phone systems in that it coordinates calls to and from phones in the area which is covers. The MTSO also connects its cells to the conventional land line telephone system and controls the base station in each of its cells.

This wireless ability, along with the existing infrastructure illustrated in FIG. 2, allows Central Control 10 (via gateway 22) to communicate with remotely located REC's 14 without the huge capital investment of creating a new infrastructure, or laying dedicated land-lines to each REC.

Conventional Phone System

The conventional land-line telephone system 22 utilizes central telephone switching offices or CTO's distributed around the country, one for each area code. Communications can go into the conventional telephone system at various times.

Figure 3:
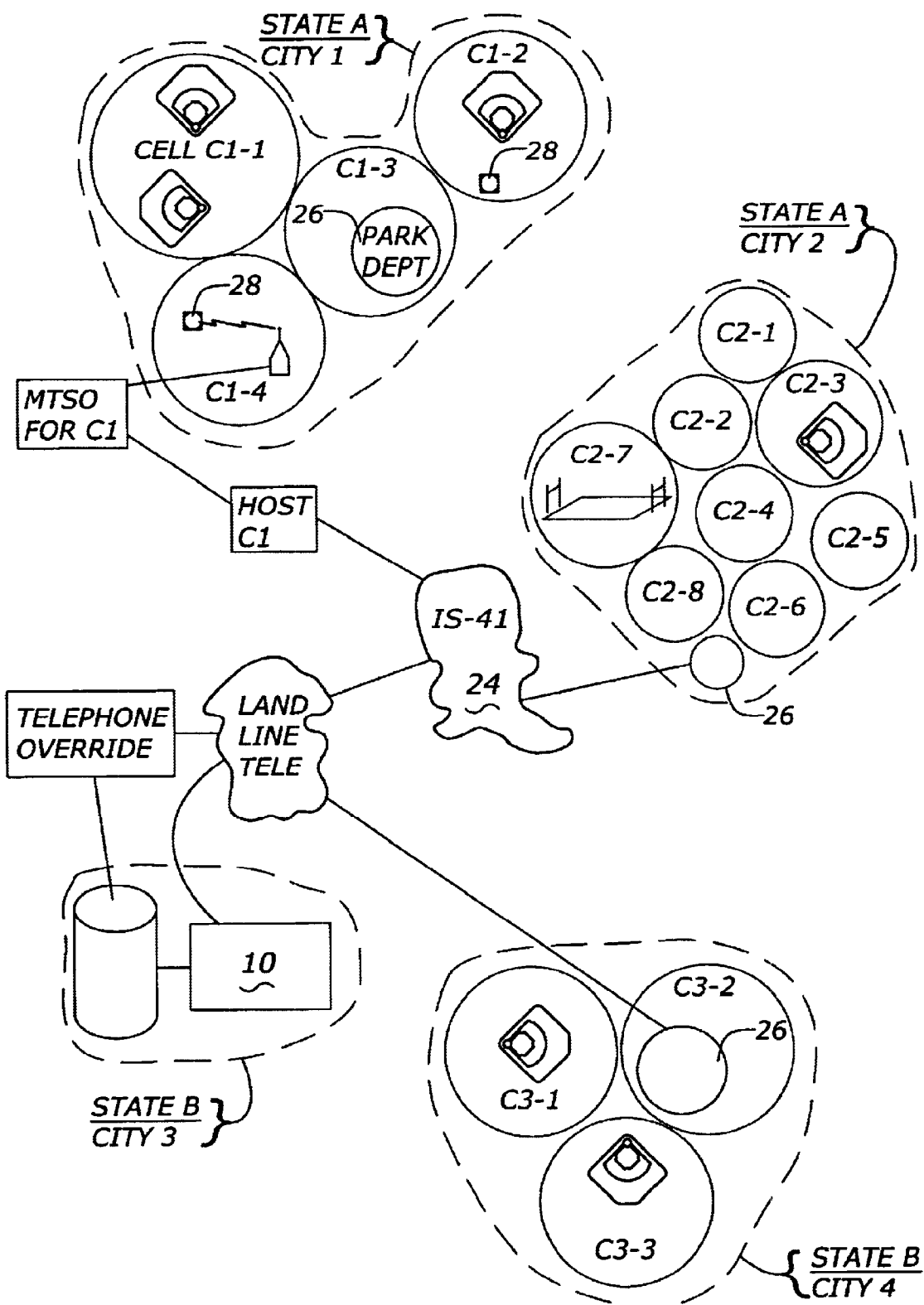
FIG. 3 is a diagrammatic overview of how persons communicate with Central Control.

This is illustrated in FIG. 3. If a customer 26 wishes to communicate with Central Control 10, one way is via a land line call (either voice or fax). Other ways are via a cell call (which could in part involve land line telephone), or via e-mail (again usually by Internet 30). It is even possible for a customer to make a personal visit to Central Control 10 to seek or convey information.

Cellular Phone or Radio

Cell phones 20, also referred to as radios 20, are conventional cellular radios. An example is an Ericsson TXR module AM10 AMPS cellular radio (cellular receiver). Such components are relatively small (roughly 2" W by 4" L by ½" D), are durable (mostly solid-state), and relatively inexpensive.

The mechanism to send a part of the MIN from radio 20 to PLC 50 is as follows. An AT modem command (industry standard) emulates modem communication protocol and allows radio 20 to talk to PLC 50 through a serial data port. The communication is full handshake, full duplex and approximately 2400 baud.

AMPS Communication Protocol

As previously discussed, a significant aspect of AMPS cellular communication is the precise way in which cellular calls are routed. It is important to an understanding of the present invention, to understand this.

FIG. 4 illustrates one cellular radio 20 in cell C1-1 of cellular system C1. Base station 42 of cell C1-1 services radio 20 and is connected to MTSO 40-C1 of system C1, which in turn is connected to the IS-41 intersystem network 24.

MTSO 24, through base station 42, communicates with radio 20 as follows. Forward control channel FOCC and reverse control channel RECC allow the base station 42 and the radio 20 respectively to communicate call initiation information and perform other functions. Forward voice channel FOVC and reverse voice channel REVC carry the voice messages (audio) to and from radios 20.

Conventionally, use of the FOCC and RECC are for very short times and traffic over these channels is not as high as the voice channels, where the real voice communication occurs. Conventionally, FOCC and RECC are primarily used to register radio 20 to enable it to receive or make a call.

As described earlier, because FOCC and RECC are primarily used in this manner, and because of the AMPS protocols, the amount of data communicated over these control channels is limited. Specifically, information on the FOCC when initiating a remote call to radio 20 is limited to essentially the MIN, that is, ten digits in the abc-efg-wxyz format described above. To reach radio 20, the first six digits can not be altered. The first three (abc) are the area code for the call, directing the call to the general geographic area of the home cellular system for the cellular radio 20. The next three (efg) are the local CTO number, a further geographical narrowing. The final four digits of the MIN (wxyz) are an identification number for the specific radio 20 so that the call knows which radio it is supposed to be directed to.

If the MIN sent out by the caller matches with the MIN of the called radio 20, the cellular system assigns the frequencies for the voice channels FOVC and REVC, the duplex communication can begin. Prior to that assignment of a voice channel, all of the signaling is accomplished solely over the IS-41's FOCC and RECC.

Thus, in the instance of FIG. 4, if cellular radio 20 has the MIN of 080-377-4000, a call from Central Control 10 (via gateway 22) would involve dialing that number. The MIN would be carried over IS-41 (reference numeral 24). As is well-known in the art so that it will not be described in detail here, the IS-41 network 24 is able to discern the "home" cellular system for that MIN, but also can discern where the radio 20 matching the MIN is currently at geographically (because radio 20 periodically sends out its MIN and lets the intracellular network know where its at).

Thus, the registration process that is used by the cellular telephone system to prepare for a call to a cellular phone is used here. What is sometimes actually referred to as a "page" is made through the cellular network to the cellular phone being called. The cell phone must tell the cellular system that it is on and ready. The cellular network notifies the entire USA of this (or more accurately, notifies all geographic areas covered by the IS-41 intersystem network). The cell phone scans for the strongest FOCC to get to nearest base station and sends its MID/ESN/and home system SID (all goes to the relevant MTSO). The cell phone is registered with local cellular system if everything checks out.

If the home cellular system validates the MIN, the call is registered and is ready to commence. In this example, the radio having the MIN of 080-377-4000 would receive its MIN over the FOCC. This registration process, taking only hundreds of milliseconds, is essentially a "page" which lets the nationwide intra cellular network 26 know that remote phone 20 has come on-line. It is important to note that over the FOCC, only the ten digit MIN is sent to radio 20. In the forward direction (over FOCC from base 42 to radio 20), only three digits of the MIN are available to carry information.

Radio 20 sends the ten digit MIN as well as a 32 bit Electronic Security Number or ESN over the RECC, and therefore only from radio 20 back to base station 42. Thus, the 32 bits are not available in the forward direction for instructions to REC 14. Other information may be sent over the forward or reverse control channels (e.g. home system ID), but such does not change the basic fact that the only "data" so to speak that might be carried over the FOCC (base 42 to radio 20) in the MIN is the last three digits of the MIN. For reasons dictated by the AMPS protocol, only the last three digits are potentially utilizable for carrying data or instructions.

Therefore, as discussed above, one would be deterred from looking to the AMPS limitation of three possible digits in the FOCC, if one were looking for a way to send digital instructions. However, it is in this very environment that the preferred embodiment functions.

Figure 5:
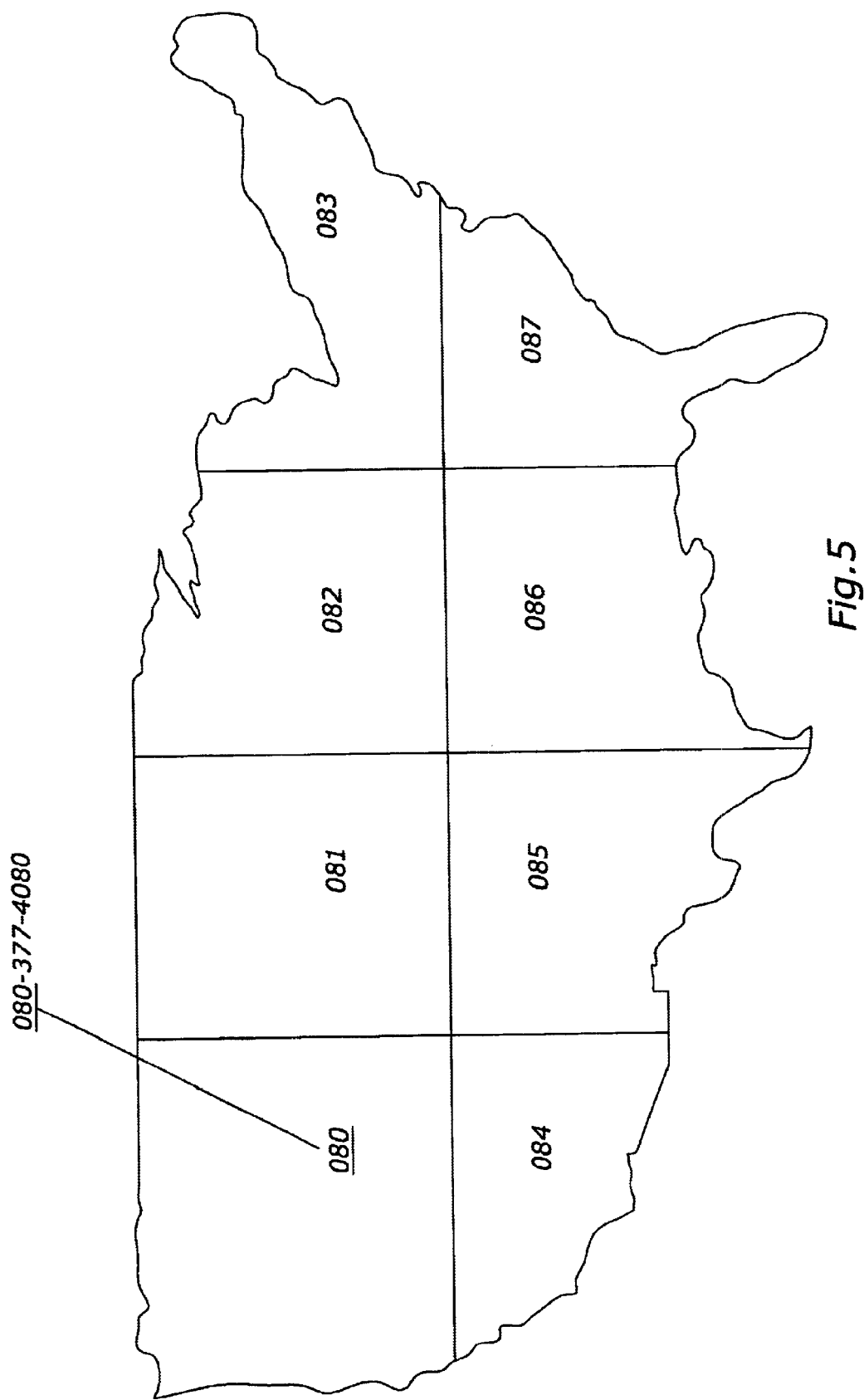
FIG. 5 is a simplified diagram illustrating area code geographic coverage for the United States according to a preferred embodiment of the invention.

As shown in FIG. 4, radio 20 according to the preferred embodiment is given anywhere from one to a substantial plurality of MIN's to which it will respond. Taking again the example of a MIN in the form of 080-377-4000, FIG. 5 shows how the USA for example, is divided up into a plurality of area codes 080 through 087. A call from Central Control 10 to 080-377-4000 would route the call to the 080 area code, here illustrated to be in the Northwest part of the United States.

Figure 6:
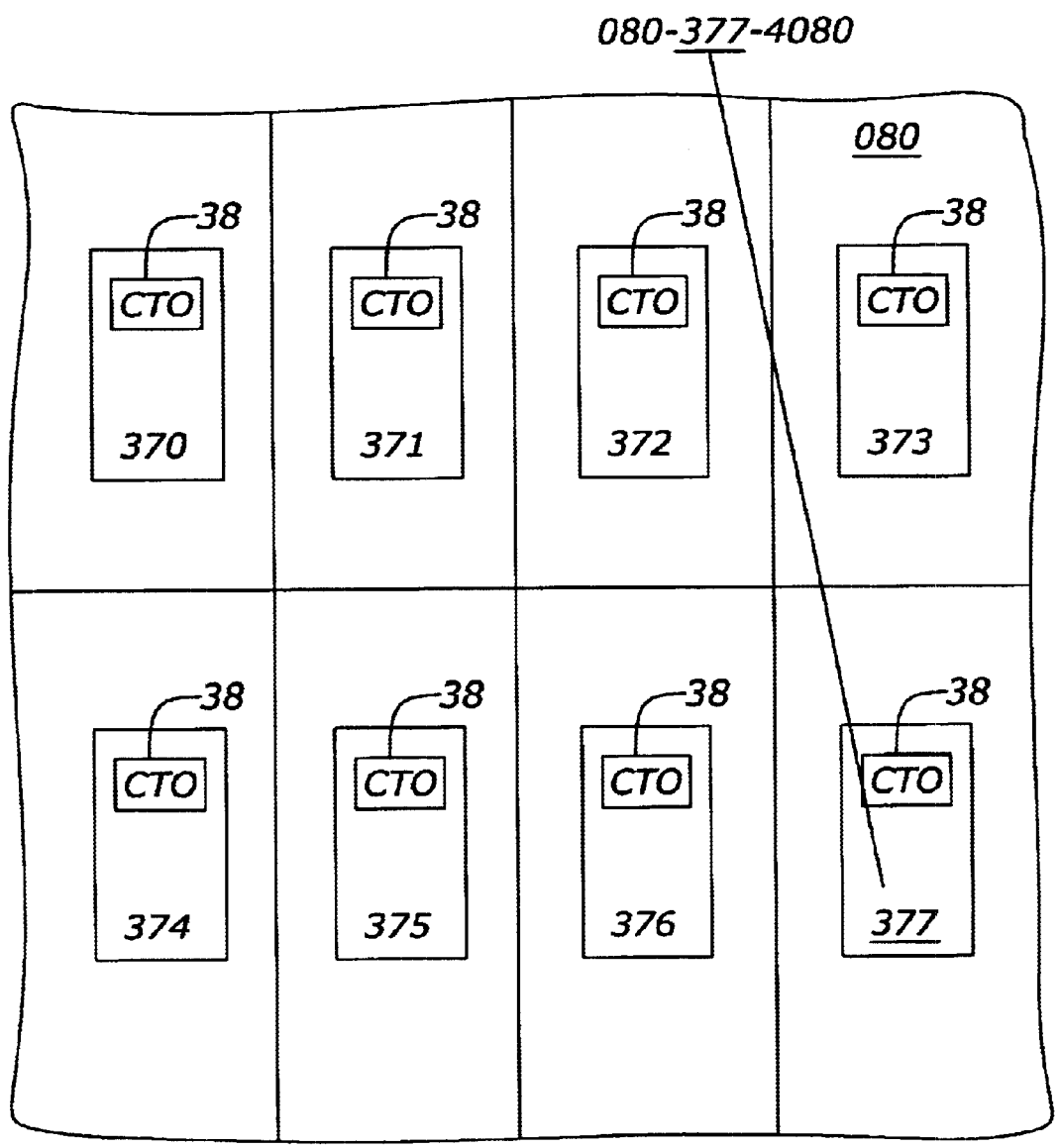
FIG. 6 is a simplified diagram illustrating local central switching office geographic coverage for an area code of FIG. 5.

FIG. 6 illustrates that the geographic extent of area code 080 is sub-divided into a plurality of regions 370 to 377, each serviced by a CTO 38. Each region is identified by the three digit number and therefore in this example the call is routed to CTO identified by "377".

Figure 7:
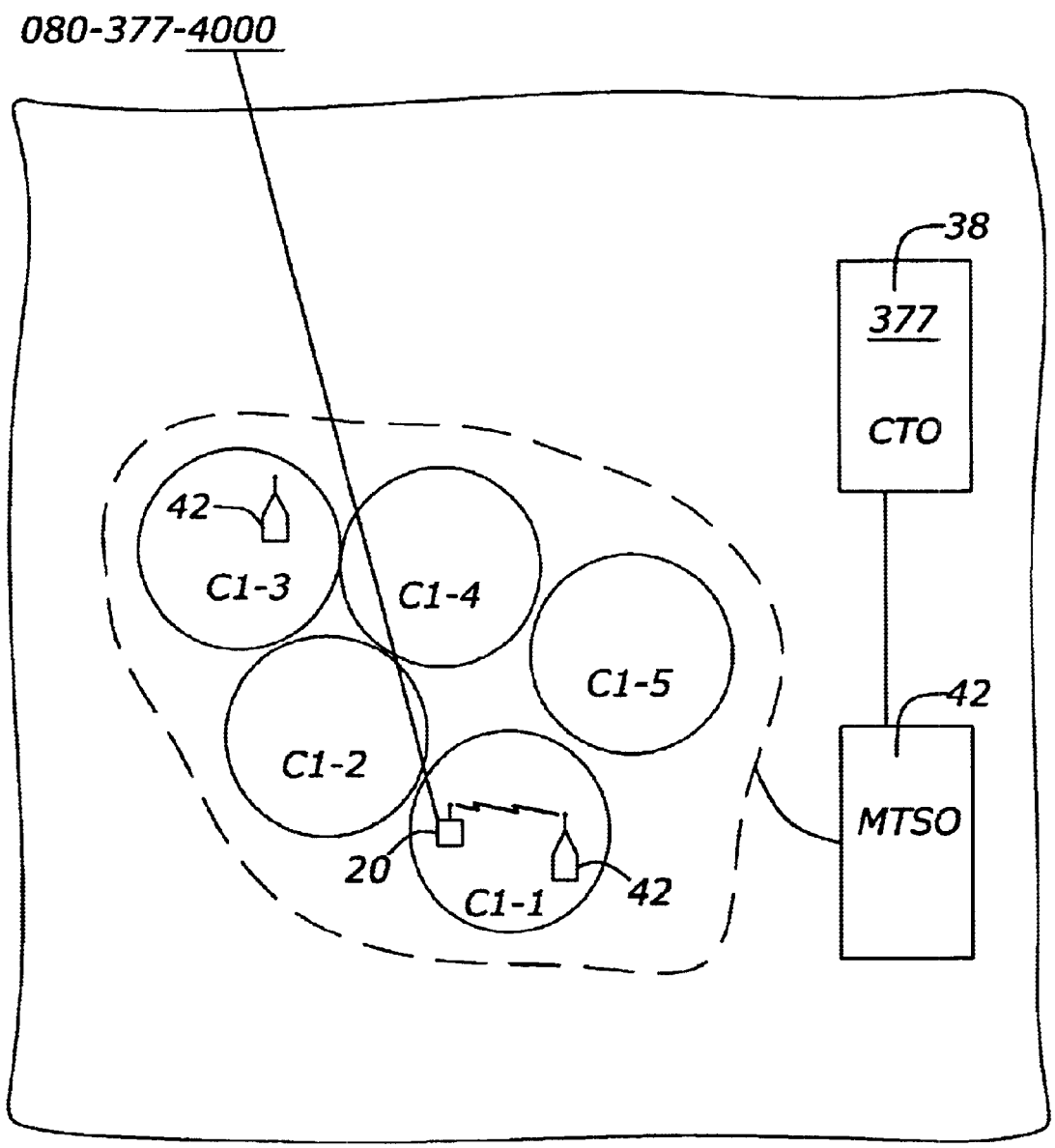
FIG. 7 is a simplified diagram illustrating mobile identification number geographic relationship for local central switching office coverage of FIG. 6.

FIG. 7 illustrates that CTO 377 would provide the MIN to the appropriate MTSO 40, which would track down the cell (here C1-1) receiving the strongest signal or vise versa relative to the radio with the MIN 080-377-4000, and sends the MIN over the FOCC at base station 42 in cell C1-1, to that radio 20. Thus, radio 20, responding to this called number or MIN, is found in msecs over the cellular network control channels.

Gateway

In one embodiment of the invention, a third party administrator (in cooperation with input from Central Control 10) could be used to control the calling to cellular radios 20. The third party could also obtain proprietary area codes, CTO numbers, and phone IDs unavailable to other persons or companies. This would ensure that no accidental or intentional but unauthorized caller could send calls in the system of the invention.

The third party would effectively function like an MTSO, but have a proprietary control office for the cell phones in the system. By appropriate controls and software, the third party could restrict any outgoing calls in case an MIN and/or MIN/ESN is poached.

Furthermore, the third party could send cancellation messages after a certain time for each paging to free up space and capacity over the cellular control channels.

Information could be sent to the third party from the Internet, any intranet, or land-line. This third party, called a "gateway" between Central Control and the regular cellular system, would essentially act as a "home" cellular system or MTSO for all cellular phones associated with the preferred embodiment. Therefore, all those cell phones would essentially be roaming the cellular intersystem network. The gateway would place a "call" to a roamer cell phone via its special MTSO programmed to accept the special MIN's.

An example of such a third party gateway is Cellemetry of Atlanta, Ga. In their system, the MTSO can be programmed with up to ten MIN's per cellular radio. Higher numbers of MIN's per phone are possible.

FIGS. 13–15 show how the gateway system could be accessed by Central Control, and how scheduling and other relevant information can be provided form Central Control 10 to gateway 22 via a private secure location in the gateway website.

Remote Equipment Controller or REC

In this embodiment, communications hardware, software, and networks have been described which allow Central Control to use the quick, low cost control channels of the AMPS cellular telephone protocol to contact a plurality of remote cell phones using existing infrastructure. Use of this communication to affect a function at a remote lighting system 12 involves utilization of a remote equipment controller or REC 14, which will now be described in more detail.

Figure 9:
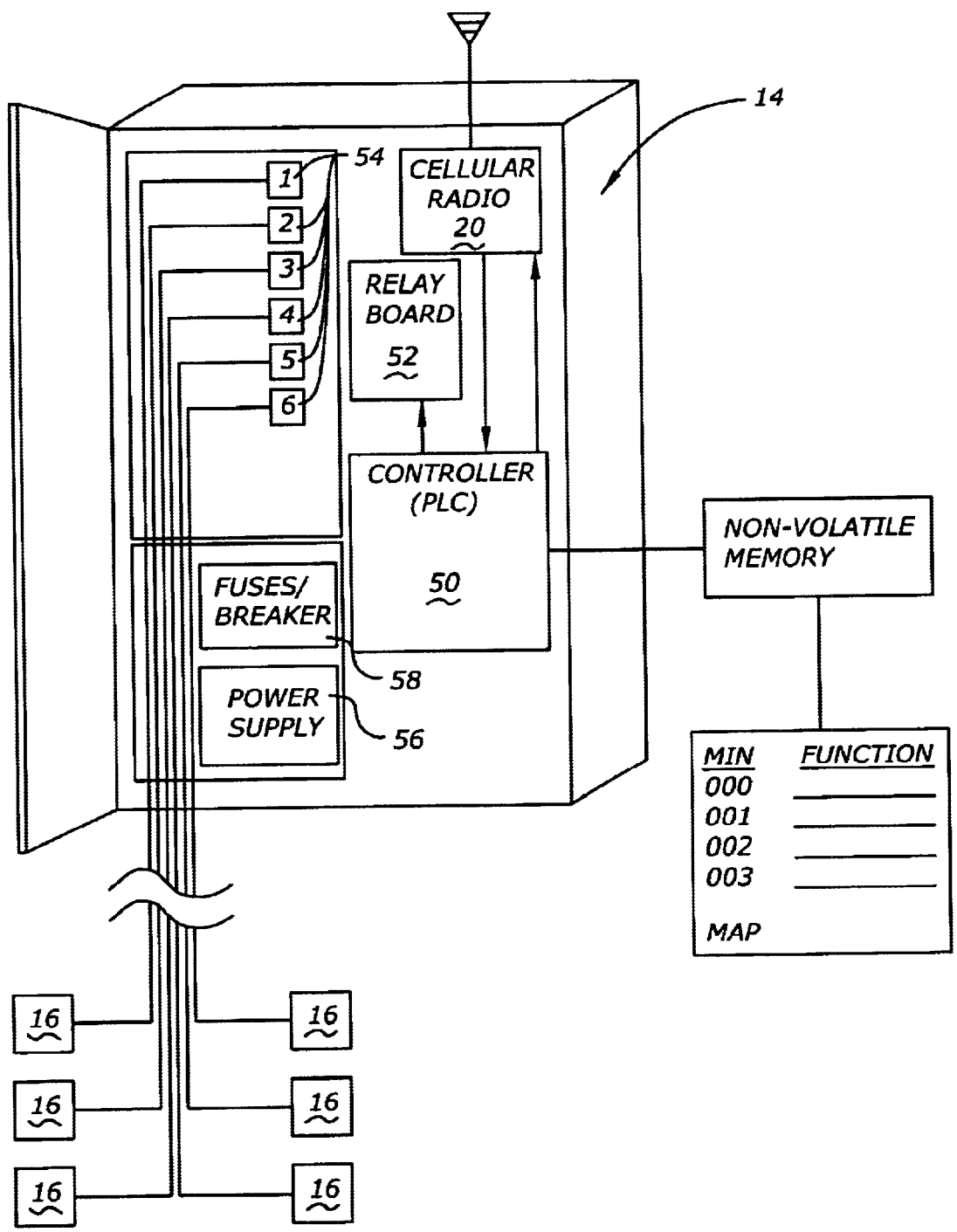
FIGS. 9 and 9B is a diagrammatic view of a Remote Equipment Controller of the lighting system of FIG. 8.
Figure 9B:
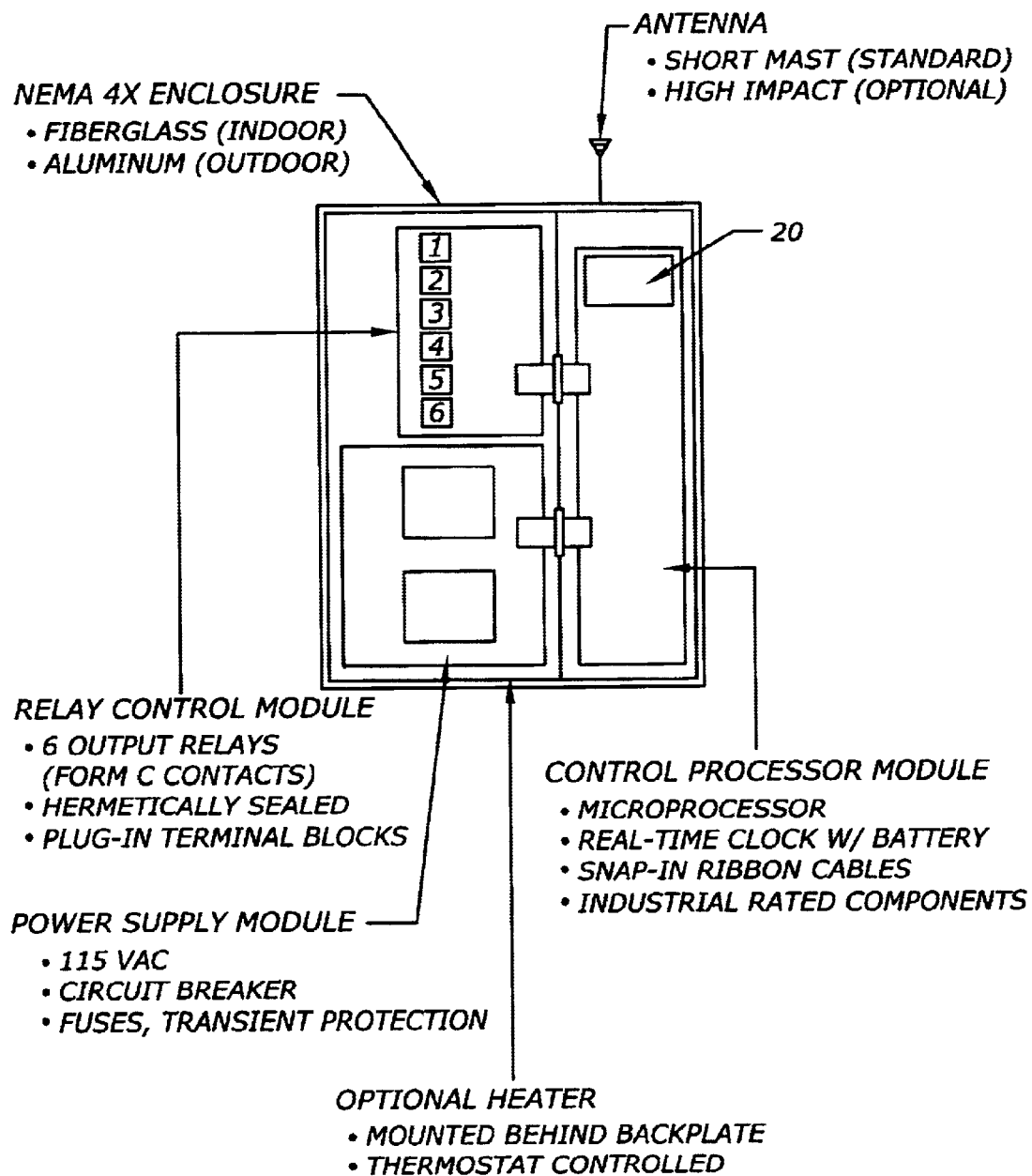

By referring to FIGS. 8 and 9, the REC 14 can be seen in one form. For lighting systems, particularly outdoor systems, REC 14 can be contained in a lighting contractor cabinet or an LCC 48 (e.g. NEMA 4X enclosure-fiberglass (indoor) or aluminum (outdoor), 16" (H)×14" (W)×6.25" (D)), fully assembled and factory. tested. The LCC could be separate.

Major components of REC 14, in addition to cellular radio 20, include controller 50 (e.g. a PLC), relay board 52 and power supply 56. The contactors and fuses/breakers could be in the LCC. Relevant characteristics of these components are set forth below.

Controller 50 can be a 87C52 from Intel Corporation. It includes non-volatile memory into which a database is pre-programmed. Authorized MIN's for radio 20 are mapped to instructions in the database. The instructions are then carried out by PLC 50 by sending electrical instructions to other component(s) of REC 14. When a call is made to REC 14 using a MIN to which REC 14 responds, controller 50 (via appropriate connection to radio 20) is given the authorized MIN and thus can map the MIN to its stored instruction set for that REC 14. Non-volatile memory retains information even in power outages or brown-outs.

Multiple (e.g. eight) output relays are used on relay board 52 to control electrical loads such as conventional lighting contactors Multiple lighting contactors 54 (e.g. six Siemens Sirius 3R series individual Form C contacts, hermetically sealed maximum 7.5 amp at 120 VAC)) are controlled by the relays of board 52. By this method, the very high voltage/current needed by the high-powered lights (e.g. 1500 Watt Metal Halide lamps), can be turned off or on by much lower voltages/currents.

Optionally, multiple (e.g. eight) three-position selector switches (Off-On-Auto or OOA, Make-Before-Break or MBB) could be included in REC 14 or LCC or a separate enclosure for convenient access. They could be door mounted, with one red pilot light for each OOA switch. The function of these switches will be discussed below.

Electrical power could be delivered through a duplex receptacle—120 VAC (for field service tools). Primary and secondary fusing as well as terminal blocks could be used for this incoming power, load wiring and REC control. The input power supply (e.g. 115 VAC (+/−10%)) can have replaceable fuse and transient protection. All internal devices are widely available. Some could be DIN rail mounted for easy replacement. Approvals and standards include UL 916-energy management system for the REC, and FCC part 15 for a Class A device.

REC 14 includes separate line voltage Off-On-Auto switches (OOA) for each control circuit. New installations are pre-engineered and factory assembled which includes all necessary contactors, OOA switches and control transformer, fuse blocks and terminal strips. REC 14 allows manual control of high voltage 3 phase sports lighting or automatic control from the REC.

REC 14 could include a short mast, noise free, high impact durable antenna (when unit is mounted outside) or a standard whip antenna for inside.

Optionally an internal heater with regulating thermostat could be factory installed (recommended where outside temperature drops below 15 degrees F.).

REC 14 can be pre-wired, fully tested wiring harness between relays and lighting contactors. Plug-in screw terminals accommodate up to No. 14 AWG wire. It can have snap-in electronic circuit boards with built in test buttons to verify operation ability to test the unit with a direct page or by a portable computer connected through a serial communication port.

OPERATION

The present system first requires input from the customer as to an on/off schedule for the customer's lights. As discussed previously, this information can come into Central Control 10 in a number of different ways and from almost anywhere. FIG. 10 illustrates a schedule for the hypothetical Twin Peaks Park District of State A, City 1. Five different lighting zones are to be controlled, one being simply security lights. ON and OFF times are formatted by the customer or Central Control 10 in a fashion that can be entered into the Central Control database.

FIG. 11 illustrates some of the additional information that would be pre-programmed into that database. Details about the relays and contactors in the REC 14 for the lights in each lighting zone are pre-known and in the database. A default schedule could optionally be entered.

Central Control's computer therefore knows when to turn each lighting zone on and off. The customer sets the schedule.

Alternatively, the authorized customer can enter or change on/off times. A template such as FIG. 10 or 11 could be used to enter a new ON/Off schedule or to review or modify a current schedule.

As shown in FIG. 8, the user of the system can send information regarding instructions at a remote lighting facility via the Internet, e-mail, a cellular telephone call, or even a standard call. When this information is received at the central location, the user's request will be identified and matched to instructions contained in the PLC at the remote equipment controller. The instructions contained in the remote equipment controller can be standard instructions or can be personalized through each user.

The central location will have a plurality of mobile identification numbers designated from a cellular carrier. This cellular carrier will have access to area codes outside of the common carrier accessibility. Therefore, a standard cellular or standard telephone could not be called using the system. FIG. 3 details an exemplary hypothetical list of possible MIN numbers designated to the central location for a specific user.

The cellular telephone system has been split up into an "A" channel and a "B" channels. All receivers can listen to only one channel, A or B, at any given time. Also, a radio can respond to "even" or "odd" MINs but not both. Therefore, looking at FIG. 3 the representation of 080-377-4000 ("even" MIN) would represent the same function as 080-377-4001 ("odd" MIN). They are mapped to the same function.

Figure 12:
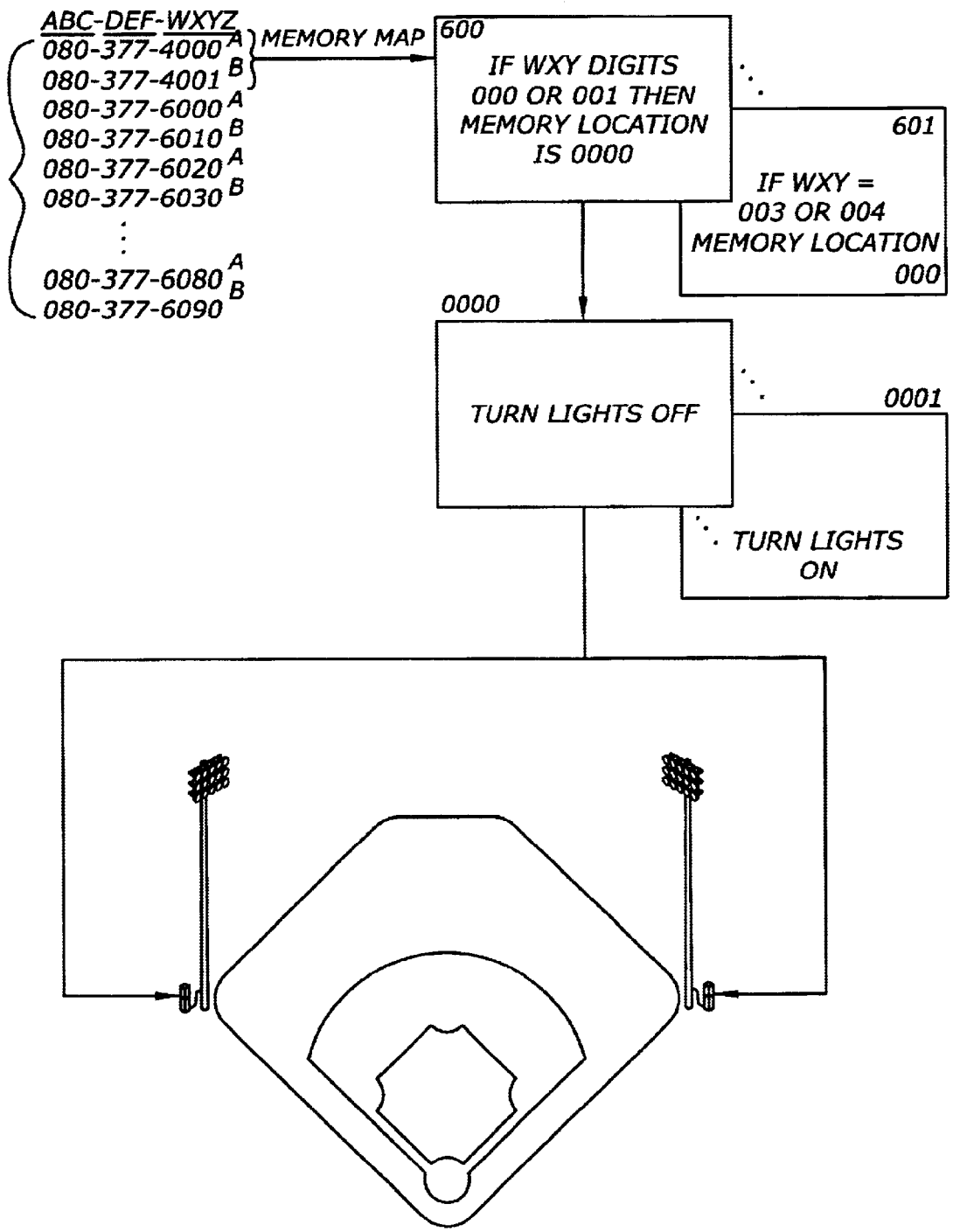
FIG. 12 is a diagrammatic depiction of how control instructions are sent and implemented at the ball field.

By referring to FIG. 12, most MIN's are assigned from a cellular provider a plurality of mobile identification numbers to achieve a plurality of functions. The cellular provider will have access to area codes not accessible to common carriers. These assigned mobile identification numbers can range from a plurality of last four digits in an area code to a plurality of office codes and available last four digits inside those codes.

PLC 50 can be pre-programmed with desired functions. PLC 50 contains the memory map where the functions are stored. Each memory location inside the memory map directly maps to a respective MIN number. By referring to FIG. 12, a remote equipment controller (REC 14) or wireless remote lighting controller receives the MIN from the cellular provider. REC 14 is normally collocated with the lighting system.

Referring to FIG. 8, Control Central receives information via the Internet or telephone from the customer location. This information is then translated to a respective function or MIN number and transferred to the cellular provider.

Central Control 10 places a call which goes to that carrier's computer (MTSO). It checks where the remote radio 20 is (if in its "HOME" area, the carrier's computer knows because of registration process). If radio 20 is in a "VISITING" area, the intracellular network finds and then knows where it is at. The carrier sends a MIN to the location of a nearby antenna, which broadcasts the MIN and rings radio 20.

Once the mobile identification number for the specific function chosen by the user has been obtained, the number is then sent to the cellular provider that has assigned the MIN's to the central location office. Referring to FIG. 8, the cellular provider then sends this information to either a satellite (or an antenna, through broadcast or hardwire), inside of the cell where the remote equipment controller is located. The MIN is then sent to the phone via the control channel of standard cellular telephone usage.

A control channel only carries data. By using the control channel there is no interference with the voice channel.

Radio 20 essentially listens for its number and acts according to logic at REC 14. REC 14 receives and stores messages. It looks at the MIN received at radio 20, in the form "abc-def-wxyz", where abc=area code (proprietary to gateway so no one else can interface with the functioning of these communications), def=CTO number, wxyz=w000 to w999; giving possibly up to 1000 instructions. It automatically turns the lights on or off per user schedule. It is thus remotely controlled by a cellular signal.

Referring to FIG. 9, when the remote equipment controller receives the MIN via cellular radio 20, the remote equipment controller will decode the last three digits of the MIN. The PLC will then take these three digits and memory map them to a location containing the function desired to be performed at the remote lighting system. When that function has been found, the PLC then sends confirmation back to Central Control and the function is performed.

Looking at FIGS. 12 and 13, there is a possibility for a plurality of functions. In the example of FIG. 3 there could be hundreds of functions. There may be more in the future.

Thus, by this method the schedule for each lighting system is automatically accomplished by Central Control sending out pages through the control channels of the cellular phone network to appropriate REC's at appropriate times.

The primary MIN "wakes up" radio 20, or in other words, lets radio 20 know that an instruction will follow shortly (within a pre-selected time—e.g. 60 seconds). The gateway codes a plurality of what will be called "secondary MINs" to a plurality of functions to be carried out by REC 14, and stores those secondary MINs in the gateway database. The gateway continuously scans (e.g. every minute) the schedules in the database. Whenever the schedule for a particular zone of lights indicates that an action time approaches for that zone of lights, the gateway encodes a MIN based on the current state of the relays for the particular REC involved and then fires off that secondary MIN into the IS-41 signaling network [with appropriate routing so that it will be transported to the appropriate radio 20.

Radio 20 receives the secondary MIN, and passes all digits of the MIN to PLC 50. The pre-programmed map in PLC 50 decodes the last three digits xyz and generates the appropriate control signal to the appropriate relay(s) to either turn that zone of lights ON or OFF, depending on the schedule.

In practice, each relay is activated or deactivated by relatively low voltage but controls whether the high voltage needed by a bank of sports lights, for example, is supplied to the lights to turn them ON and operate them. Each individual relay or group of relays is controlled by one or more MINs; one set of MINs to turn the relay(s) ON; one set to turn the relay(s) OFF. Therefore, if the schedule requires that substantial sized area to be lit (i.e. which requires several banks or zones of lights to turn on), more than one relay must be controlled at the scheduled time. Multiple MINs can not be sent to a single radio 20 in parallel; the gateway must send a "primary" MIN first, to "wake up" or "alert" radio 20 and then send a "secondary" MIN to perform a control function. The gateway waits for a predetermined time (e.g. approx. 60 seconds), and then sends another "wake up" primary MIN followed by a secondary MIN to perform other control or scheduling function, and so on until all necessary scheduling functions have been specified. The gateway must therefore initiate the whole procedure far enough ahead of the scheduled time for use of the field so that all lights are on at that time.

The gateway knows which radio 20 was just woken and knows which instruction it needs to send to that radio 20. Therefore, the secondary MINs do not have to be unique for each radio 20. This allows for many less proprietary MINs to be obtained (MIN reuse). It can also allow for a standard MIN set to be created regardless of what radio 20 is involved. The gateway locks any other message from going to a waken up radio 20 until either a secondary MIN is received and a confirmation is sent back or a set period of time expires (the radio "times out").

The back end software at the gateway essentially operates according to the following flow chart:

Scan database on request or every set amount of time.

Look for schedules whose time is up for transmission.

Encode secondary MIN based on an action to be performed for each REC related to each schedule up for transmission.

Send Primary MIN to relevant radio to wake it up.

Follow Primary MIN with the encoded secondary MIN to the radios.

The gateway can use a UNIX or Windows NT based computer. The Webserver (e.g. Microsoft Internet Information Server or Apache) can run on Windows NT or Unix. The website of the gateway can be programmed in a combination of Java, HTML, Microsoft SQL, Delphi, and Perl languages. The database can be programmed in Microsoft SQL, Oracle, or Progress.

It is possible for feedback to be generated by the REC and sent back to the gateway. As discussed above, the reverse control channels have the advantage of carrying the 32 bit ESN as well as the MIN. By appropriate programming of radio 20 and PLC 50, the ESN can be masked and replaced with data. In the present embodiment, 8 bits are used to tell the gateway such things as (a) instruction received and executed or (b) instruction received but not understood. If radio 20 wakes up with the primary MIN but does not receive a secondary MIN within a set period of time, PLC 50 can execute a "time out" function on its own, and could indicate this over the 8 bit message masked over a part of the ESN.

In any of the above cases, the gateway would receive and decipher the 32-bit return message from the REC. The gateway could then send a communication in any of a variety of forms to Central Control so that Central Control knows what occurred. Central Control in turn could communicate in any of a variety of ways with its customers.

Because of the 32 bits in the ESN, a return message to the gateway could include other information. Examples are: what the signal strength was of the received instruction, how many times radio 20 had to be paged before it sent a confirm back to the gateway, the identity of the switch that the antenna connected to, and status codes, such as whether the function was completed or not.

OPTIONS, ALTERNATIVES, FEATURES

The included preferred embodiment is given by way of example only, and not by way of limitation to the invention, which is solely described by the claims herein. Variations obvious to one skilled in the art will be included with the invention defined by the claims.

One option of the system is to confirm the carrying out of the schedules to the customer. As shown in FIG. 3, a customer can be notified via email or fax that the schedule has been entered into Central Control and/or carried out at the customer's lighting systems.

Some other options are as follows. There may be times were the lights need to be turned on or off outside the established schedule in the database at Central Control. For example, there may be a need to turn lights ON early (for a pre-game test or unscheduled event) or keep lights ON longer (if a game is running later than planned) or turn lights OFF early (game canceled or cut short, bad weather).

One override method one is a telephone override. It works in this manner: customer will call a toll-free number and speak with a Control Central staff person. That person will validate the customer's PIN against the central database and enter the requested changes on the customer's behalf. In the case of trying to extend the ON time, users need to call at least 15 minutes before scheduled OFF time to ensure that the new messages will be received by the REC 14 before the automatic OFF time. Another override method two involves the use of the Off/On/Auto (OOA) switches previously described. Each REC will have individual OOA switches for each control zone. The REC will operate automatically when the OOA is in the AUTO position. In the ON position the lights will remain ON until the OOA switch is changed to OFF or back to AUTO.

Another option is to assign more than one MIN to a cell radio 20. One line (the first MIN) is rung, then the calling phone hangs up. The PLC could go into wait loop where stop and listen (the PLC is alerted). If a call is received on any of other nine lines (e.g. nine) within a period of seconds (e.g. 30) then PLC 50 knows to do function 1; if line 2, function 2; . . . ; if line 9, . . . , function 8.

During a power failure, relays go to their default state (i.e. NO or NC). After normal power returns, the REC unit will auto-restart and resume normal operation. PLC 50 remembers the last state and schedule of the relays prior to power loss and restores them to the appropriate state upon resumption of power.

The simplest use of the system according to the preferred embodiment, is to simply initiate the cellular page to remote radio 20. The PLC associated with that radio 20 reads the MIN that is attempted to be paged by Central Control 10, and in particular, reads the last three digits of the MIN. Once the page is decoded, the PLC simply turns the lights on or off.

As is known in the art, if there is a need to send data back to Central Control from the REC, one might be able to use the 32 bit ESN in reverse control channel communications from radio to control central. This would allow up to 32 bits of information to be sent back for remote monitoring and status information. The ESN could be "masked out" by the gateway company. It can also be reprogrammed on the fly in the field.

Some examples of remote monitoring over the reverse control channel, as opposed to remote control over the forward control channel are as follows:
  a) Measurement
  b) Poll information
  c) Monitor, use thresholds, if exceeded, let us know
  d) Alarm monitoring
  e) Security alarms
  f) On-demand status
  g) Location/GPS
  h) Track mobile equipment
  i) Motion detectors or sensors
  j) Can override PLC if game too long.
  k) Can function as security device/alarm if notices activity during "off" hours
  l) Rain sensors
  m) Photo detectors
  n) Measure lamp life
  o) Detects malfunction or light is out
  p) Data gather lamp life, field usage, energy usage Areas and facilities that can use this device are:
  a) Park districts
  b) Schools
  c) Ballfields
  d) Sports complexes
  e) Golf course
  f) Ski resorts
  g) Racetracks
  h) Sportslighting
  i) Security
  j) Parking lots
  k) Door locks One alternative embodiment to this, is that there would be a plurality of books of functions inside the PLC. The first call to the remote equipment controller would identify which book the functions are located in and the next call would identify what function to use inside that book.

And yet another embodiment splits the clock inside the PLC into segments. Each segment would have up to 1,000 (000–999) functions. See FIG. 13. By using this method the central location can greatly expand the amount of functions used in a limited MIN number range. Therefore, each MIN number would represent a different function depending on what time it was. Thus if a central location only had 500 MIN numbers, by splitting the clock into five segments the central location would have up to 2,500 functions available. In order to achieve this operation the clock(s) at the central location and the clock at the remote equipment controller would have to be synchronized to avoid error. Therefore, a command coming from the central location would have to synchronize the clocks at a time interval to stop the clocks from drifting.

Confirmation options. Multiple confirmations could be sent to customers, e.g.:
  a) Schedule request received (e.g. via e-mail to end user from control central)
  b) Action transmitted to gateway company (e.g. e-mail to end user)
  c) Action was executed at REC.

The invention has been described in some detail as to the requirements for each aspect of the invention. Specific examples are now shown of a data representation of the time schedule and a command instruction set that could be used. The creation of a data representation of a time schedule and a command instruction can vary as is well known in the art and the data representations shown are by way of example and are in no way limiting.

Time Schedule

FIG. 22 shows how the customer's schedule can be represented by a data structure or data format that reduces the amount of memory needed and the amount of data that needs to be communicated in a complete one week long time schedule. One method of doing so involves grouping the relays into groups. For example, a group size of 8 relays can be selected. A number of groups can be determined, such as 10 groups. For each group, a number of events can be assigned for a given time period during which the events are to occur. Turning on the lights and turning off the lights are examples of events. In one embodiment, four events can occur in a day. This would, for example, permit one or more groups of relays to turn on and then off and then on and then off in a single day. To decrease the amount of storage required for a time slot while still permitting small enough time divisions such that lights can be efficiently controlled, 96 time slots per day can be used. This permits 15 minute wide time slots each day.

When only two types of events are used (i.e. ON and OFF), these events can be represented by a single bit. When 96 time slots are used these time slots can be represented with 7 bits. Because 7 bits permits 128 different discrete values there will be additional space. One use of this additional space is to add time slots for sunrise and sunset.

The table below also summarizes the space allocation required for a one week long schedule.

|  | Space required |
|---|---|
| Event | 8 bits (1 byte)<br>7 bits for time slot<br>1 bit for ON/OFF |
| Day | 4 bytes<br>4 events of 1 byte |
| Group (1–8 relays per group) | 28 bytes<br>7 days of 4 bytes |
| Schedule | 280 bytes<br>10 groups of 28 bytes |

Command Set

Three digits are available for commands. Each digit can be represented in a binary coded decimal (BCD) notation. A cellular radio can only hear transmissions that have "even" numbers or "odd" numbers. One bit of this last digit (least significant bit) indicates if the number is even (bit=0) or odd (bit=1). Therefore, this bit can not be used for command or data information, reducing the number of possible commands by two. For example, if a command to turn all groups on is given, this command could be communicated to either of two cellular radios in any given area. Therefore two 3-digit commands, differing by the least significant bit of the least significant digit are needed to ensure that the same command will be issued regardless of which type of radio happens to be as the recipient of that call. For example, in one embodiment the three digit command of 500 could be the command to turn off all lights for one cellular radio and then, correspondingly, the command 501 (500 and 501 differ by the least significant bit) would be needed to have the same effect to provide the same operation for a different radio.

The following table summarizes the 3 digit commands that are available in the forward channel direction. Note that some commands require more than a single page in order to implement. Where multiple pages are necessary, the number is specified. In addition, there is a corresponding registration response from the REC. This registration response can be one or more registration messages. Each registration message can be a verification of the information sent in the forward channel direction, or else each registration message can contain data. There may be multiple verification messages or multiple data messages or both.

| 3-Digit Command No. (Decimal) Even, Odd | Command Name | No. of Forward Channel Pages | Registration Response No. + Type |
|---|---|---|---|
| 0X0, 0X1 | Turn Group X Off at Time in Bin 1 | 1 | 1 - Verification |
| 0X2, 0X3 | Turn Group X Off at Time in Bin 2 | 1 | 1 - Verification |
| 0X4, 0X5 | Turn Group X off at Time in Bin 3 | 1 | 1 - Verification |
| 0X6, 0X7 | Turn Group X Off at Time in Bin 4 | 1 | 1 - Verification |
| 0X8, 0X9 | Turn Group X Off at Time in Bin 5 | 1 | 1 - Verification |
| 1X0, 1X1 | Turn Group X Off at Time in Bin 6 | 1 | 1 - Verification |
| 1X2, 1X3 | Turn Group X Off at Time in Bin 7 | 1 | 1 - Verification |
| 1X4, 1X5 | Turn Group X Off at Time in Bin 8 | 1 | 1 - Verification |
| 1X6, 1X7 | Turn Group X Off at Time in Bin 9 | 1 | 1 - Verification |
| 1X8, 1X9 | Turn Group X Off at Time in Bin 10 | 1 | 1 - Verification |
| 2X0, 2X1 | Turn Group X Off at Time in Bin 11 | 1 | 1 - Verification |
| 2X2, 2X3 | Turn Group X Off at Time in Bin 12 | 1 | 1 - Verification |
| 2X4, 2X5 | Turn Group X Off at Time in Bin 13 | 1 | 1 - Verification |
| 2X6, 2X7 | Turn Group X Off at Time in Bin 14 | 1 | 1 - Verification |
| 2X8, 2X9 | Turn Group X Off at Time in Bin 15 | 1 | 1 - Verification |
| 3X0, 3X1 | Turn Group X Off at Time in Bin 16 | 1 | 1 - Verification |
| 3X2, 3X3 | Turn Group X Off at Time in Bin 17 | 1 | 1 - Verification |
| 3X4, 3X5 | Turn Group X Off at Time in Bin 18 | 1 | 1 - Verification |
| 3X6, 3X7 | Turn Group X Off at Time in Bin 19 | 1 | 1 - Verification |
| 3X8, 3X9 | Turn Group X Off at Time in Bin 20 | 1 | 1 - Verification |
| 4X0, 4X1 | Clear Schedules Group X | 1 | 1 - Verification |
| 4X2, 4X3 | Turn Group X ON Now | 1 | 1 - Verification |
| 4X4, 4X5 | Turn Group X Off Now | 1 | 1 - Verification |
| 500, 501 | Turn All Groups ON | 1 | 1 - Verification |
| 502, 503 | Turn All Groups OFF | 1 | 1 - Verification |

-continued

| 3-Digit Command No. (Decimal) Even, Odd | Command Name | No. of Forward Channel Pages | Registration Response No. + Type |
|---|---|---|---|
| 504, 505 | Set Day of Month for Reporting | 2 | 1 - Verification |
| 508, 509 | Initiate Time Schedule | 1 | 1 - Verification |
| 510, 511 | Reset Alarms | 2 | 1 - Verification + Data |
| 512, 513 | Reset Controller | 1 | none |
| 520, 521 | Read Real-time Clock | 1 | 2 - Verification + Data |
| 522, 523 | Set Real-time Clock (YY/MM/DD) | 2 | 1 - Verification |
| 524, 525 | Set Real-time Clock (Hours & DST) | 2 | 1 - Verification |
| 526, 527 | Set Real-time Clock (Minutes) | 2 | 1 - Verification |
| 530, 531 | Read Astronomic Data | 1 | 2 - Verification + Data |
| 532, 533 | Set Astronomic Data (Latitude) | 2 | 1 - Verification |
| 534, 535 | Set Astronomic Data (Longitude) | 2 | 1 - Verification |
| 536, 537 | Set Astronomic Data (Sunset, Sunrise, GMT) | 2 | 1 - Verification |
| 540, 541 | Get Radio Status | 1 | 1 - Verification |
| 544, 545 | Suspend Radio from Service | 1 | 1 - Verification |
| 546, 547 | Restore Radio to Service | 1 | 1 - Verification |
| 548, 549 | Get Radio Registration Pass/Fail Count | 1 | 1 - Verification + Data |
| 550, 551 | Get Switching Status | 1 | 1 - Verification + Data |
| 552, 553 | Get System Port Status | 1 | 1 - Verification + Data |
| 554, 555 | Run Diagnostic/Get Status | 1 | 1 - Verification + Data |
| 556, 557 | Get DAU Current Mismatch | 1 | 1-3 - Verification + Data |
| 558, 559 | Get DAU 1–6 Alarm Status | 1 | 1-6 Verification + Data |
| 560, 561 | Set Group Occupant Warn Enable/Disable | 2 | 1 - Verification |
| 562, 563 | Test Occupant Warn Output | 2 | 1 - Verification |
| 564, 565 | Enable/Disable Motion Sensors | 2 | 1 - Verification |
| 566, 567 | Enable/Disable Miscellaneous Flags | 2 | 1 - Verification |
| 570, 571 | Set Remote Switches 5–8 to Group X | 2 | 1 - Verification |
| 572, 573 | Set Remote Switches 1–4 to Group X | 2 | 1 - Verification |
| 574, 575 | Set Relays 5–8 to Group X | 2 | 1 - Verification |
| 576, 577 | Set Relays 1–4 to Group X | 2 | 1 - Verification |
| 580, 551 | Get Channel 1–8 StartsTotalization | 1 | 4 - Verification + Data |
| 582, 583 | Get Channel 1–8 Manual Mode Totalization | 1 | 8 - Verification + Data |
| 584, 585 | Get Channel 1–8 Auto Mode Totalization | 1 | 8 - Verification + Data |
| 586, 587 | Get Relay 1–8 State + Reason Code | 1 | 3 - Verification + Data |
| 590, 591 | Get REC Alarm Status | 1 | 2 - Verification + Data |
| 6XX, 7XX, 8XX, 9XX | Time Schedule Event Change Message | 2 | 1 - Verification |

FIG. 23 shows a generic form of a command of a FOCC address page, a FOCC data page, a second FOCC data page and a registration response. A checksum is included in the verification to provide for error detection.

The checksum is the decimal sum of the last three digits of the address page added to the last three digits of the command page added to the last three digits of data page represented as an eight bit value. The result is then converted to a One's Complement and kept as a single 8-bit value.

It is to be understood that there may be one or multiple data pages in the FOCC direction and that there may be one or multiple data pages in the registration response. This use for communicating data in the RECC direction is known in the art.

What is claimed:

1. A method for control of remote devices comprising:
   storing in a first location information related to one or more events related to a resistive or inductive electrical load;
   communicating data related to an event from said first location to a second location related to said resistive or inductive electrical load over a wide-area communications link, at least partly wireless cellular communication, within a part of a mobile identification number on a control channel of the cellular communication, the data comprising an instruction related to operation of the resistive or inductive electrical load, the instruction selected from a data base including an instruction set, the instruction set including individual instructions each communicatable over a unique mobile identification number to the second location;
   carrying out an action related to the resistive or inductive electrical load at the second location in response to said data.

2. The method of claim 1 further comprising a plurality of resistive or inductive electrical loads positioned at second and other locations.

3. The method of claim 1 wherein said second location is remote from said first location.

4. The method of claim 1 wherein said stored information comprises a schedule of events related to the second location.

5. The method of claim 1 wherein a cellular receiver is positioned at the second location to receive the data in the form of a mobile identification number, said cellular receiver configured to respond to one or more mobile identification numbers.

6. The method of claim 1 wherein the resistive or inductive electrical load is a lighting device.

7. The method of claim 6 wherein the lighting device is a sports lighting device or security lighting device.

8. The method of claim 7 wherein the sports lighting device comprises a plurality of sports lighting lights, each comprising a resistive or inductive electrical load.

9. The method of claim 8 wherein the plurality of sports lights can be located at a second location or multiple locations.

10. The method of claim 1 further comprising revising the stored information from time to time.

11. The method of claim 1 further comprising communicating data from the second location to the first location.

12. The method of claim 11 wherein the data from the second location to the first location comprise information regarding status of the resistive or inductive electrical load, or a condition related to the resistive or inductive electrical load or second location.

* * * * *

UNITED STATES PATENT AND TRADEMARK OFFICE
CERTIFICATE OF CORRECTION

PATENT NO. : 6,681,110 B1  Page 1 of 1
DATED : January 20, 2004
INVENTOR(S) : Crookham et al.

It is certified that error appears in the above-identified patent and that said Letters Patent is hereby corrected as shown below:

Column 9,
Line 17, should read:
-- Control central 10 is located in State C, City 3. In this --
Line 24, should read:
-- State C, and City 3 in State C. --
Line 35, should read:
-- State C, in City 3. As is well-known in the art, Central --

Column 10,
Line 40, should read:
-- MTSO 40, through base station 42, communicates with --

Column 11,
Line 14, should read:
-- intracellular network know where it is at). --

Column 14,
Line 34, should read:
-- looking at FIG. 4 the representation of 080-377-4000 --

Signed and Sealed this

Eighth Day of March, 2005

JON W. DUDAS
*Director of the United States Patent and Trademark Office*